United States Patent
Park et al.

(10) Patent No.: US 11,252,415 B2
(45) Date of Patent: Feb. 15, 2022

(54) DMVR-BASED INTER-PREDICTION METHOD AND DEVICE

(71) Applicant: LG Electronics Inc., Seoul (KR)

(72) Inventors: Naeri Park, Seoul (KR); Junghak Nam, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/391,500

(22) Filed: Aug. 2, 2021

(65) Prior Publication Data

US 2021/0368180 A1    Nov. 25, 2021

Related U.S. Application Data

(63) Continuation of application No. PCT/KR2020/001788, filed on Feb. 7, 2020.
(Continued)

(51) Int. Cl.
| | |
|---|---|
| *H04N 19/137* | (2014.01) |
| *H04N 19/132* | (2014.01) |
| *H04N 19/176* | (2014.01) |
| *H04N 19/159* | (2014.01) |
| *H04N 19/46* | (2014.01) |
| *H04N 19/105* | (2014.01) |

(52) U.S. Cl.
CPC ........ *H04N 19/137* (2014.11); *H04N 19/105* (2014.11); *H04N 19/132* (2014.11); *H04N 19/159* (2014.11); *H04N 19/176* (2014.11); *H04N 19/46* (2014.11)

(58) Field of Classification Search
CPC .... H04N 19/137; H04N 19/46; H04N 19/105; H04N 19/132; H04N 19/159; H04N 19/176
See application file for complete search history.

(56) References Cited

U.S. PATENT DOCUMENTS

| | | | |
|---|---|---|---|
| 2018/0278950 A1* | 9/2018 | Chen | ............... H04N 19/176 |
| 2020/0228815 A1* | 7/2020 | Xu | ............... H04N 19/44 |

(Continued)

FOREIGN PATENT DOCUMENTS

| | | |
|---|---|---|
| EP | 3435673 | 1/2019 |
| KR | 10-2017-0073681 | 6/2017 |

(Continued)

*Primary Examiner* — Francis Geroleo
(74) *Attorney, Agent, or Firm* — Fish & Richardson P.C.

(57) ABSTRACT

An image decoding method performed by a decoding device according to the present document comprises the steps of: deriving a motion vector for a current block; determining whether to apply refinement to the motion vector for the current block; deriving a refined motion vector by applying decoder-side motion vector refinement (DMVR) to the motion vector if it is determined to apply refinement to the motion vector for the current block; deriving prediction samples for the current block on the basis of the refined motion vector; and generating reconstruction samples for the current block on the basis of the prediction samples, wherein the step of determining whether to apply refinement includes determining whether to apply the refinement on the basis of at least one of the size of the current block and bi-prediction weight index information for the current block.

14 Claims, 10 Drawing Sheets

Related U.S. Application Data

(60) Provisional application No. 62/805,950, filed on Feb. 14, 2019.

(56) References Cited

U.S. PATENT DOCUMENTS

2020/0382807 A1* 12/2020 Liu .................. H04N 19/44
2021/0203946 A1* 7/2021 Sethuraman ......... H04N 19/577

FOREIGN PATENT DOCUMENTS

| KR | 10-2018-0055761 | 5/2018 |
| KR | 10-2018-0134764 | 12/2018 |
| WO | WO2018121506 | 7/2018 |

* cited by examiner

DMVR-BASED INTER-PREDICTION METHOD AND DEVICE

CROSS-REFERENCE TO RELATED APPLICATIONS

Pursuant to 35 U.S.C. § 119(e), this application is a continuation of International Application PCT/KR2020/001788, with an international filing date of Feb. 7, 2020, which claims the benefit of U.S. Provisional Patent Application No. 62/805,950 filed on Feb. 14, 2019, the contents of which are hereby incorporated by reference herein in its entirety.

BACKGROUND OF THE DISCLOSURE

Field of the Disclosure

The present document relates to an image coding technology, and more specifically, to a method and an apparatus for performing inter prediction based on a decoder-side motion vector refinement (DMVR).

Related Art

The demands for high-resolution and high-quality images and video, such as an ultra high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

SUMMARY

This disclosure provides a method and an apparatus for increasing image coding efficiency.

This disclosure also provides a method and an apparatus of an efficient inter prediction.

This disclosure also provides a method and an apparatus for performing an inter prediction based on a Decoder-side Motion Vector Refinement (DMVR).

This disclosure also provides a method and an apparatus for performing an inter prediction based on a Bi-directional optical flow (BDOF).

This disclosure also provides a method and an apparatus for enhancing prediction performance by providing a condition for determining whether to apply a DMVR for enhancing image coding efficiency and/or a condition for determining whether to apply a BDOF.

The exemplary embodiment of the present document provides an image decoding method performed by a decoding apparatus. The method includes deriving a motion vector of a current block, determining whether to apply refinement to the motion vector of the current block, deriving a refined motion vector by applying a decoder-side motion vector refinement (DMVR) to the motion vector, when determining to apply the refinement to the motion vector of the current block, deriving prediction samples for the current block based on the refined motion vector, and generating reconstructed samples for the current block based on the prediction samples, in which the determining of whether to apply the refinement determines whether to apply the refinement based on at least one of a size of the current block or bi-prediction weight index information of the current block.

Another exemplary embodiment of the present document provides an image encoding method performed by an image encoding apparatus. The method includes deriving a motion vector of a current block, determining whether to apply refinement to the motion vector of the current block, deriving a refined motion vector by applying a decoder-side motion vector refinement (DMVR) to the motion vector, when determining to apply the refinement to the motion vector of the current block, deriving prediction samples for the current block based on the refined motion vector, deriving residual samples based on the prediction samples, generating residual information based on the residual samples, and encoding image information including the residual information, in which the determining of whether to apply the refinement determines whether to apply the refinement based on at least one of a size of the current block or bi-prediction weight index information of the current block.

According to this disclosure, overall image/video compression efficiency can be increased.

According to this disclosure, calculation complexity can be reduced and overall coding efficiency can be enhanced through an efficient inter prediction.

According to this disclosure, various application conditions are proposed in applying a DMVR and/or BDOF of refining motion information during a motion compensation process to enhance efficiency in terms of complexity and performance.

DESCRIPTION OF EXEMPLARY EMBODIMENTS

Figure 1:
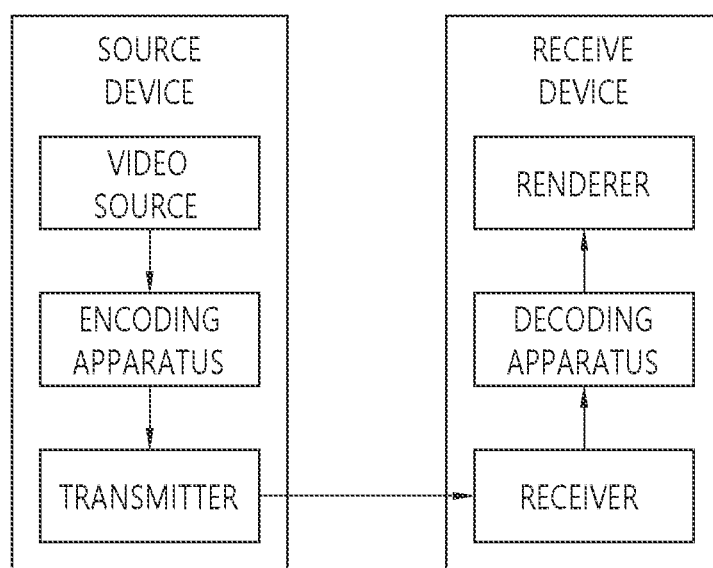
FIG. 1 schematically illustrates an example of a video/image coding system applicable to exemplary embodiments of the present document.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

Hereinafter, preferred embodiments of this document are described more specifically with reference to the accompanying drawings. Hereinafter, in the drawings, the same reference numeral is used in the same element, and a redundant description of the same element may be omitted.

FIG. 1 schematically illustrates an example of a video/image coding system to which embodiments of this document may be applied.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consists of either a number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 2:
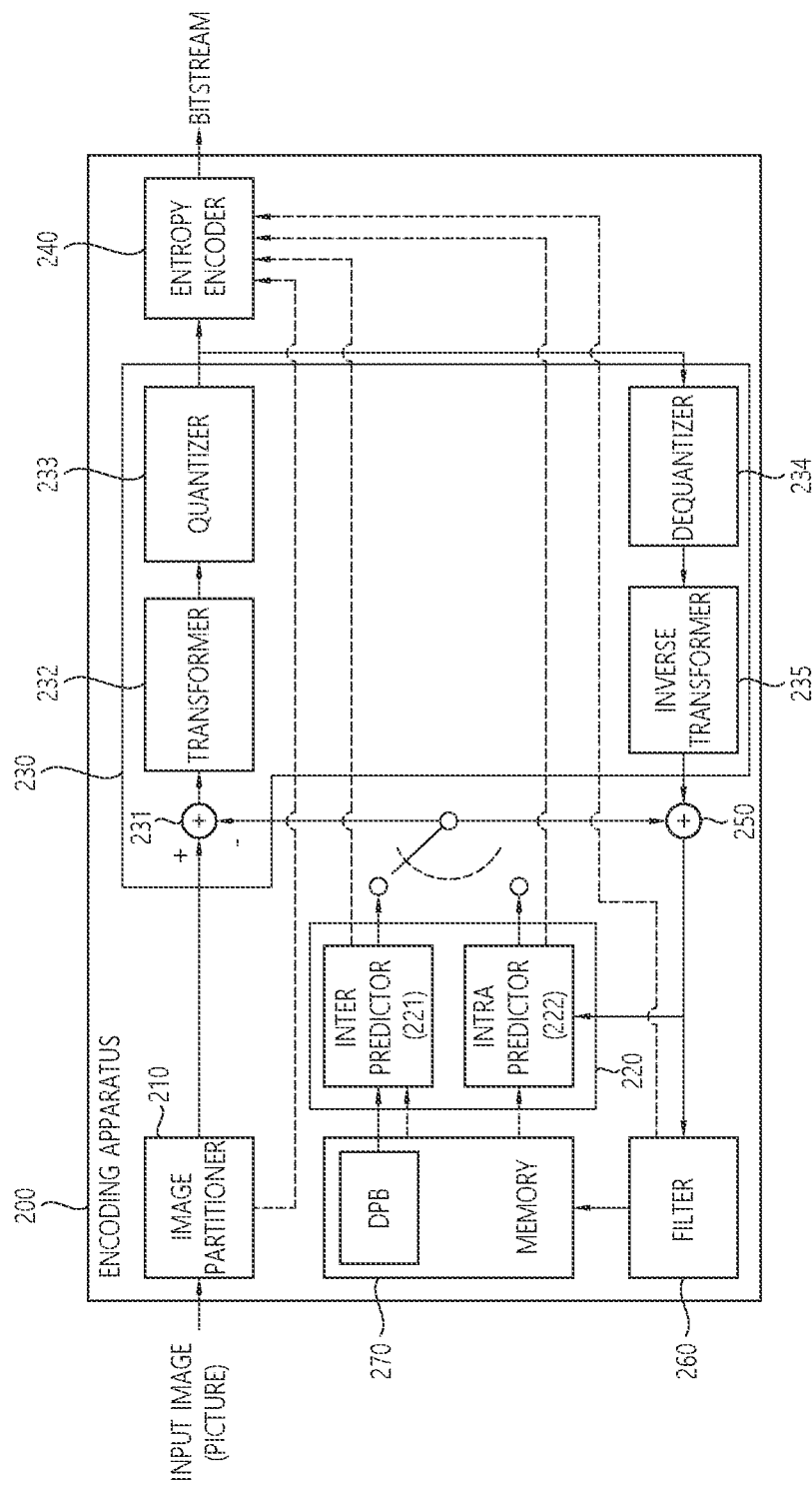
FIG. 2 is a diagram for schematically explaining a configuration of a video/image encoding apparatus applicable to the exemplary embodiments of the present document.

FIG. 2 is a schematic diagram illustrating a configuration of a video/image encoding apparatus to which the embodiment(s) of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
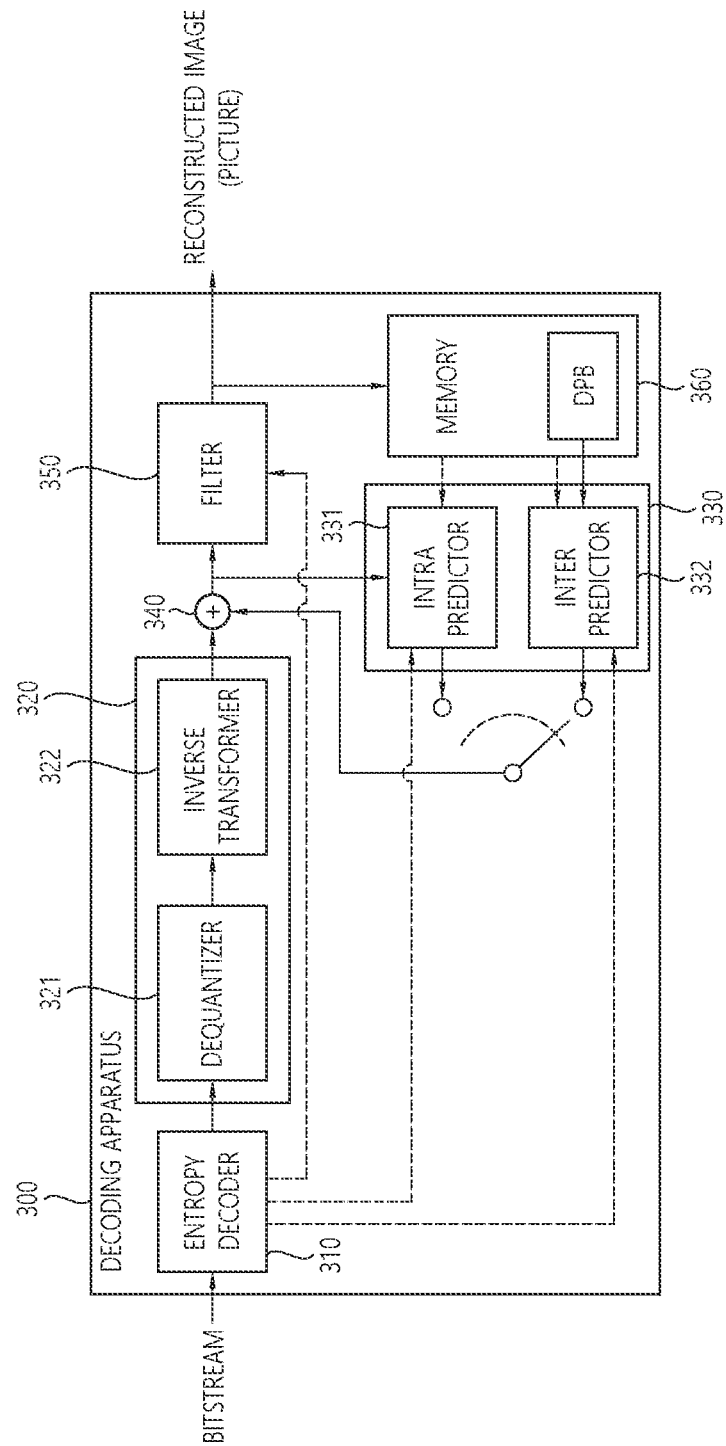
FIG. 3 is a diagram for schematically explaining a configuration of a video/image decoding apparatus applicable to the exemplary embodiments of the present document.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture.

For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

Meanwhile, as described above, the intra prediction or inter prediction may be applied when performing the prediction on the current block. Hereinafter, a case of applying the inter prediction to the current block will be described.

The predictor (more specifically, inter predictor) of the encoding/decoding apparatus may derive prediction samples by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and/or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may further include L0 motion information and/or L1 motion information according to the inter-prediction type (L0 prediction, L1 prediction, Bi prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction. Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed.

Here, the output order may correspond to a picture order count (POC) order.

Further, various inter prediction modes may be used in applying the inter prediction to the current block. For example, various modes including a merge mode, a skip mode, a motion vector prediction (MVP) mode, an affine mode, a historical motion vector prediction (HMVP) mode, and the like may be used. A decoder side motion vector refinement (DMVR) mode, an adaptive motion vector resolution (AMVR) mode, a bi-directional optical flow (BDOF) etc., may be further used as an ancillary mode. The affine mode may be referred to as an affine motion prediction mode. The MVP mode may be referred to as an advanced motion vector prediction (AMVP) mode. In the present disclosure, some modes and/or motion information candidates derived by some modes may be included in one of motion information related candidates of other modes.

The prediction mode information indicating the inter prediction mode of the current block may be signaled from the encoding apparatus to the decoding apparatus. In this case, the prediction mode information may be included in the bitstream and received by the decoding apparatus. The prediction mode information may include index information indicating one of multiple candidate modes. Alternatively, the inter prediction mode may be indicated through a hierarchical signaling of flag information. In this case, the prediction mode information may include one or more flags. For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied. The affine mode may be signaled as an independent mode or signaled as a dependent mode on the merge mode or the MVP mode. For example, the affine mode may include an affine merge mode and an affine MVP mode.

Further, the motion information of the current block may be used in applying the inter prediction to the current block. The encoding device may derive optimal motion information for the current block through a motion estimation procedure. For example, the encoding device may search a similar reference block having a high correlation in units of a fractional pixel within a predetermined search range in the reference picture by using an original block in an original picture for the current block and derive the motion information through the searched reference block. The similarity of the block may be derived based on a difference of phase based sample values. For example, the similarity of the block may be calculated based on a sum of absolute differences (SAD) between the current block (or a template of the current block) and the reference block (or the template of the reference block). In this case, the motion information may be derived based on a reference block having a smallest SAD in a search area. The derived motion information may be signaled to the decoding device according to various methods based on the inter prediction mode.

A predicted block for the current block may be derived based on the motion information derived according to the inter prediction mode. The predicted block may include prediction samples (prediction sample array) of the current block. When the motion vector (MV) of the current block indicates a fractional sample unit, an interpolation procedure may be performed and the prediction samples of the current block may be derived based on reference samples of the fractional sample unit in the reference picture through the interpolation procedure. When the affine inter prediction is applied to the current block, the prediction samples may be generated based on a sample/subblock-unit MV. When the bi-prediction is applied, prediction samples derived through a weighted sum or a weighted average of prediction samples derived based on the L0 prediction (i.e., a prediction using a reference picture in the reference picture list L0 and MVL0) and prediction samples (according to a phase) derived based on the L1 prediction (i.e., a prediction using a reference picture in the reference picture list L1 and MVL1) may be used as the prediction samples of the current block. When the bi-prediction is applied, if the reference picture used for the L0 prediction and the reference picture used for the L1 prediction are located in different temporal directions based on the current picture (i.e., if the prediction corresponds to the bi-prediction and the bi-directional prediction), this may be referred to as a true bi-prediction.

Reconstruction samples and reconstruction pictures may be generated based on the derived prediction samples and thereafter, the procedure such as in-loop filtering, etc., may be performed as described above.

Meanwhile, since the motion of the current block is predicted based on the motion vector of the neighboring block without a motion vector difference (MVD) in the skip mode and/or the merge mode, the skip mode and/or the merge mode shows a limitation in a motion prediction. In order to improve the limitation of the skip mode and/or the merge mode, the motion vector may be refined by applying a Decoder-side Motion Vector Refinement (DMVR) mode, a Bi-directional optical flow (BDOF) mode, etc. The DMVR and BDOF modes may be used when the true bi-prediction is applied to the current block.

Figure 4:
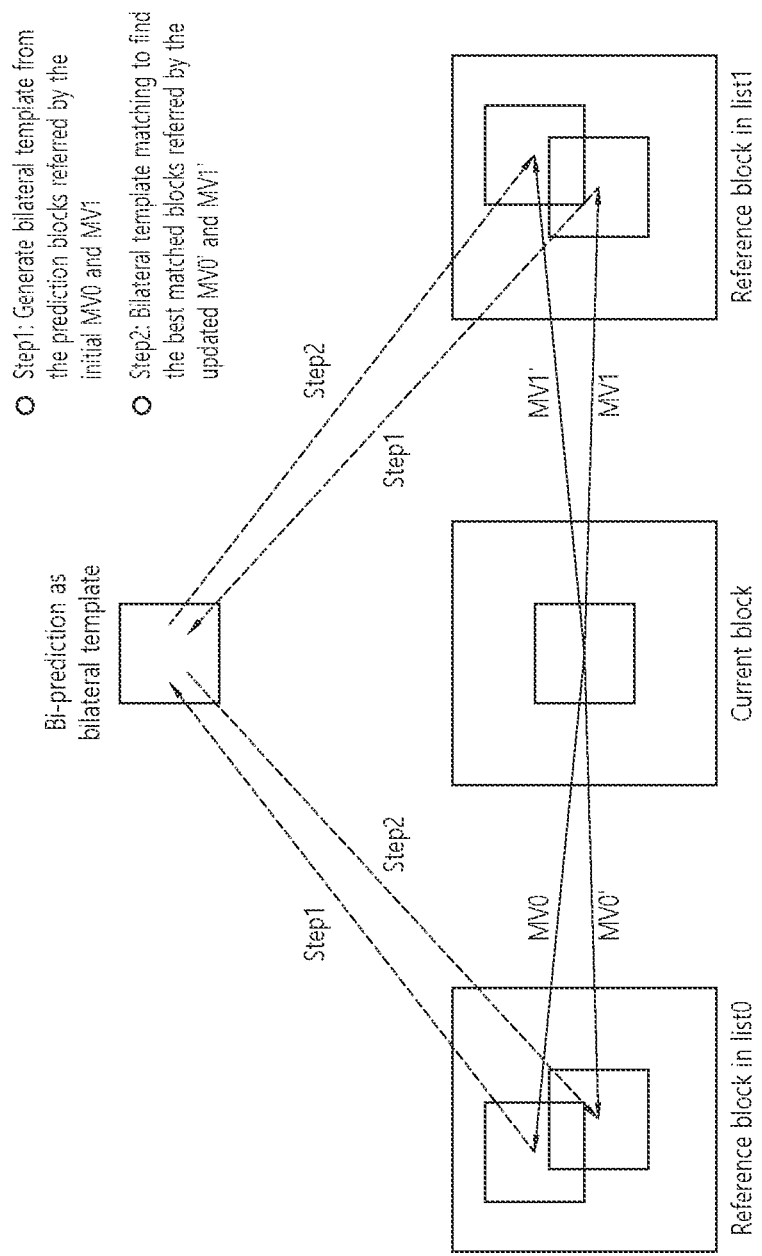
FIG. 4 is a diagram for explaining an exemplary embodiment of a process of performing a decoder-side motion vector refinement (DMVR) in a true bi-prediction.

FIG. 4 is a diagram for describing an embodiment of a process of performing a Decoder-side Motion Vector Refinement (DMVR) in a true pair prediction.

The DMVR is a method in which the decoder performs the motion prediction by refining the motion information of the neighboring block. When the DMVR is applied, the decoder may derive the refined motion information through cost comparison based on a template generated by using the motion information of the neighboring block in the merge/skip mode. In this case, precision of the motion prediction may be increased and compression performance may be enhanced without additional signaling information.

In the present disclosure, for convenience of description, the decoding apparatus is mainly described, but the DMVR according to the embodiment of the present disclosure may be performed in the same method even in the encoding apparatus.

Referring to FIG. 4, the decoding apparatus may derive prediction blocks (i.e., reference blocks) identified by list0 and list1-direction initial motion vectors (or motion information) (e.g., MV0 and MV1) and generate a template (or a bilateral template) by a weighted sum (e.g., averaging) of the derived prediction samples (step 1). Here, the initial motion vectors (MV0 and MV1) may represent motion vectors derived by using the motion information of the neighboring block in the merge/skip mode.

Figure 8:
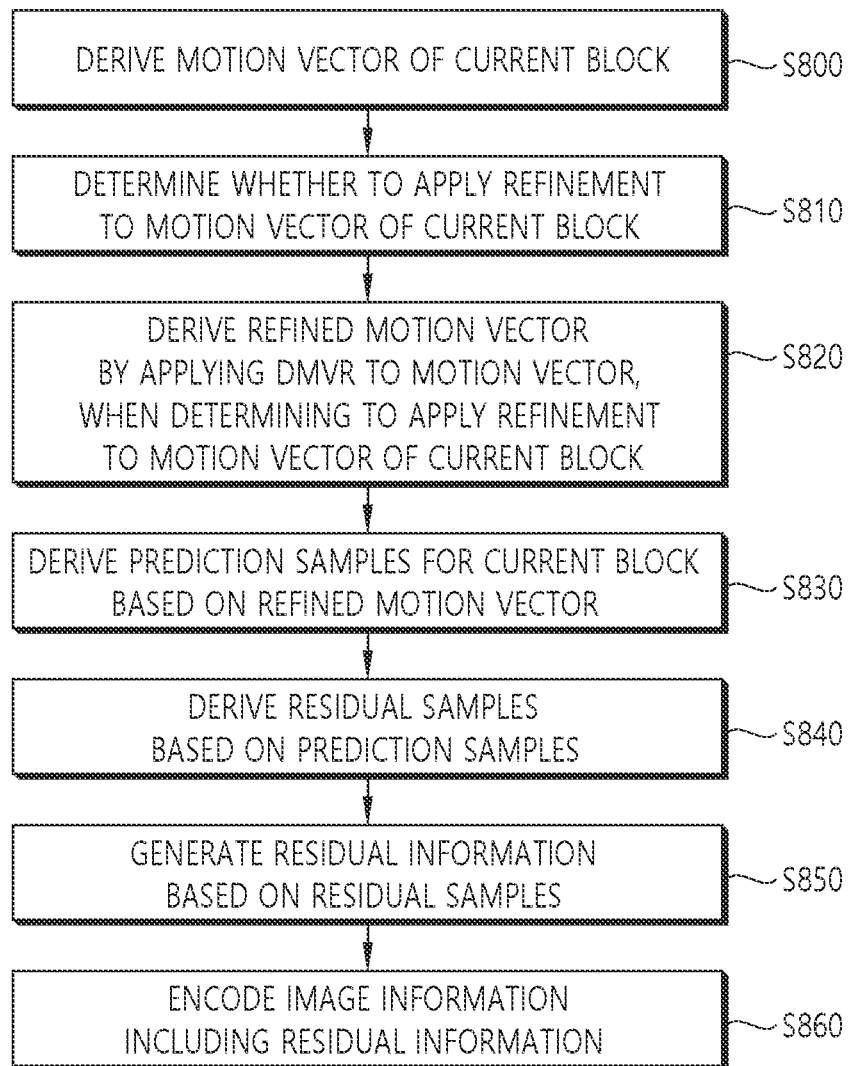
FIG. 8 is a flowchart schematically illustrating an encoding method which may be performed by an encoding apparatus according to the exemplary embodiment of the present document.

In addition, the decoding apparatus may derive motion vectors (e.g., MV0' and MV1') for minimizing a difference between the template and the sample area of the reference picture through a template matching operation (step 2). Here, the sample area may indicate a neighboring area of an initial prediction block in the reference picture and the sample area may be referred to as the neighboring area, a reference area, a search area, a search range, a search space, etc. The template matching operation may include an operation of calculating a cost measurement value between the template and the sample area of the reference picture. For example, the sum of absolute differences (SAD) may be used for the cost measurement. As one example, as a cost function, the normalized SAD may be used. In this case, matching cost may be given as SAD(T−mean(T), 2*P[x]−2*mean(P[x])). Here, T represents the template and P[x] represents the block in the search area. In addition, a motion vector for calculating minimum template cost for each of two reference pictures may be considered as an updated motion vector (replacing the initial motion vector). As illustrated in FIG. 8, the decoding apparatus may generate a final bilateral prediction result (i.e. a final bilateral prediction block) by using the updated motion vectors MV0' and MV1'. As an embodiment, multi-iteration for deriving the updated (or new) motion vector may e used for acquiring the final bilateral prediction result.

In an embodiment, the decoding apparatus may call a DMVR process in order to enhance accuracy of an initial motion compensation prediction (i.e., the motion compensation prediction through the conventional merge/skip mode). For example, the decoding apparatus may perform the DMVR process when the prediction mode of the current block is the merge mode or the skip mode and the bilateral bi-prediction in which the bilateral reference pictures are located at opposite directions based on the current picture in a display order is applied to the current block.

When the true bi-prediction is applied to the current block as described above, the BDOF may be used in order to refine a bi-prediction signal. When the bi-prediction is applied to the current block, the bi-directional optical flow (BDOF) may be used to calculate improved motion information and generate the prediction samples based on the calculated motion information. For example, the BDOF may be applied at a 4×4 subblock level. In other words, the BDOF may be performed in units of 4×4 subblocks in the current block. Alternatively, the BDOF may be applied only to a luma component. Alternatively, the BDOF may be applied only to a chroma component and applied to the luma component and the chroma component.

The BDOF mode is based on an optical flow concept assuming that an object motion is smooth as indicated by a name of the BDOF mode. A motion refinement (vx, vy) may be calculated by minimizing a difference value between the L0 and L1 prediction samples for each of 4×4 subblocks. In addition, the motion refinement may be used for adjusting the bi-prediction sample values in 4×4 subblocks.

Meanwhile, it can be seen that the DMVR and the BDOF as techniques that perform the prediction by refining the motion information (in this case, the true bi-prediction represents a case of performing the motion prediction/compensation in a reference picture of the other direction based on the picture of the current block) at the time of applying the true bi-prediction is a refinement technique having a similar concept in that it is assumed that the motion of an object in the picture is made at a predetermined speed and in a predetermined direction. However, when the true bi-prediction is performed, since a condition for applying the DMVR and a condition for applying the BDOF are different from each other, a process of checking the conditions repeatedly multiple times for each technique should be performed. Therefore, the present disclosure proposes a method that may enhance efficiency in terms of decoder complexity and performance by improving the process of checking the condition in determining the prediction mode applied to the current block.

Table 1 below shows a condition for applying the DMVR during the conventional true bi-prediction. When all conditions listed below are satisfied, the DMVR may be applied.

TABLE 1 sps_dmvr_enabled_flag is set to 1. : signaling in the SPS
merge_flag[ xCb ][ yCb ] is equal to 1. : applied when it is the MERGE/SKIP
mmvd_flag[ xCb ][ yCb ] is equal to 0. : applied when it is not the MMVD
predFlagL0[0][0]=1 and predFlagL0[1][1]=1. : bi-directional prediction
DiffPicOrderCnt (currPic, RefPicList0 [refIdxL0]) − DiffPicOrderCnt (currPic, RefPicList1 [ refIdxL1 ] ) is equal to 0. : it is the TrueBi and the distances of the bi-directional reference pictures are equal
CbHeight is greater than or equal to 8. : if the size of the block is larger than the Threshold
CbHeight*CbWidth is greater than or equal to 64. : if the size of the block is larger than the Threshold Referring to Table 1, 1) whether to apply the DMVR may be determined based on flag information (e.g., sps_dmvr_enabled_flag) signaled in a sequence parameter set (SPS) syntax. Here, the flag information (e.g., sps_dmvr_enabled_flag) may represent whether the true bi-prediction based DMVR is enabled. For example, when sps_dmvr_enabled_flag is 1 (i.e., when the true bi-prediction based DMVR is enabled), it may be determined that a condition for whether the DMVR is enabled is satisfied.

2) Whether to apply the DMVR may be determined based on flag information (e.g., merge_flag) representing whether the inter prediction is performed by using the merge mode/skip mode. For example, when merge_flag is 1 (i.e., when the inter prediction is performed by using the merge mode/skip mode), it may be determined that a condition for whether to apply the merge mode/skip mode is satisfied.

3) Whether to apply the DMVR may be determined based on flag information (e.g., mmvd_flag) representing whether the inter prediction is performed by using the merge mode with motion vector difference (MMVD) mode. For example, when mmvd_flag is 0 (i.e., when the MMVD mode is not used), it may be determined that a condition for whether to apply the MMVD mode is satisfied.

4) Whether to apply the DMVR may be determined based on whether the bilateral prediction (bi-prediction) is used. Here, the bilateral prediction may represent an inter prediction performed based on reference pictures which exist in different directions based on the current picture. For example, when predFlagL0[0][0]=1 and predFlagL0[1][1]=1, it may be determined that the bilateral prediction is applied and it may be determined that a condition for whether to perform the bilateral prediction is satisfied.

5) Whether to apply the DMVR may be determined based on whether the true bi-prediction is performed and the distances between the current picture and the bilateral reference pictures are the same as each other. In other words, it may be determined whether a distance between the current picture and an L0 reference picture (i.e., a reference picture in the reference picture list L0) and a distance between the current picture and an L1 reference picture (i.e., a reference picture in the reference picture list L1) are the same as each other. For example, when DiffPicOrderCnt(currPic, RefPicList0 [refIdxL0])−DiffPicOrderCnt(currPic, RefPicList1 [refIdxL1])=0, it is determined that the true bi-prediction is performed and the distances between the current picture and the bilateral reference pictures are the same as each other to determine that a condition for whether the distances of the bilateral reference pictures are the same as each other is satisfied.

6) Whether to apply the DMVR may be determined based on whether a height of a current block is larger than a threshold. For example, when the height of the current block is equal to or larger than 8, it may be determined that a current block size (height) condition is satisfied.

7) Whether to apply the DMVR may be determined based on whether the size of the current block is larger than the threshold. For example, when the size of the current block, height*width is equal to or larger than 64, it may be determined that the current block size (height*width) condition is satisfied.

The decoding apparatus may determine whether to apply the DMVR according to whether conditions 1) to 7) of Table 1 above are satisfied. In other words, when conditions 1) to 7) of Table 1 above are satisfied, the decoding apparatus may perform the true bi-prediction by applying the DMVR and when even any one of the conditions of Table 1 above is not satisfied, the decoding apparatus does not apply the DMVR.

Table 2 below shows a condition for applying the BDOF during the conventional true bi-prediction. When all conditions listed below are satisfied, the BDOF may be applied.

TABLE 2 sps_bdof_enabled_flag is equal to 1. : signaling in the SPS
predFlagL0[ xSbIdx ][ ySbIdx ] and predFlagL1[ xSbIdx ][ ySbIdx ]
are both equal to 1. : bi-directional prediction
DiffPicOrderCnt( currPic, refPicList0[ refIdxL0 ] ) * DiffPicOrderCnt
( currPic, refPicList1[ refIdxL1 ] ) is less than 0. : TrueBi
MotionModelIdc[ xCb ][ yCb ] is equal to 0. : if it is not the Affine
merge_subblock_flag[ xCb ][ yCb ] is equal to 0. : subblock && w
>=8 && h>=8
GbiIdx[ xCb ][ yCb ] is equal to 0. : if the GBi index is a Default
cIdx is equal to 0. : applied to only the Luma Referring to Table 2 above, 1) whether to apply the BDOF may be determined based on flag information (e.g., sps_bdof_enabled_flag) signaled in the sequence parameter set (SPS) syntax. Here, the flag information (e.g., sps_dmvr_enabled_flag) may represent whether the true bi-prediction based BDOF is enabled. For example, when sps_bdof_enabled_flag is 1 (i.e., when the true bi-prediction based BDOF is enabled), it may be determined that a condition for whether the BDOF is enabled is satisfied.

2) Whether to apply the BDOF may be determined based on whether the bilateral prediction is used. Here, the bilateral prediction may represent an inter prediction performed based on reference pictures which exist in different directions based on the current picture. For example, when both predFlagL0] and predFlagL1 are 1, it may be determined that the bilateral prediction is applied and it may be determined that a condition for whether to perform the bilateral prediction is satisfied.

3) Whether to apply the BDOF may be determined based on whether the true bi-prediction is performed. In other words, it may be determined whether the L0 reference picture (i.e., the reference picture in the reference picture list L0) and the L1 reference picture (i.e., the reference picture in the reference picture list L1) are located in temporally different directions based on the current picture. For example, when DiffPicOrderCnt(currPic, refPicList0[refIdxL0])*DiffPicOrderCnt(currPic, refPicList1[refIdxL1]) is smaller 0, it is determined that the bilateral reference pictures are located in different directions based on the current picture to determine that the condition for whether the true vi-prediction is performed is satisfied.

4) Whether to apply the BDOF may be determined based on whether the affine mode is used. Here, whether the affine mode is used may be determined by deriving MotionModelIdc. For example, when the derived MotionModelIdc is 0, it may be determined that the affine mode is not used and in this case, it may be determined that a condition for whether to apply the affine mode is satisfied.

5) Whether to apply the BDOF may be determined based on flag information (e.g., merge_subblock_flag) representing whether the inter prediction is performed in units of the subblocks. For example, when merge_subblock_flag is 0 (i.e., when the merge mode is not applied in units of the subblocks), it may be determined that a condition for whether to apply the merge mode in units of the subblocks is satisfied.

6) Whether to apply the BDOF may be determined based on whether GBi exists. Here, whether the GBi exists may be determined based on GBi index information (e.g., GbiIdx). For example, when GbiIdx is 0 (i.e., when the GbiIdx is default), it may be determined that a condition for whether the GBi exists is satisfied.

7) Whether to apply the BDOF may be determined based on whether the current block is a luma block including the luma component. For example, when an index (e.g., cIdx) indicating whether the current block is the luma block (i.e., when the current block is the luma block), it may be determined that a condition for whether the current block is the luma block is satisfied.

The decoding apparatus may determine whether to apply the DMVR according to whether conditions 1) to 7) of Table 2 above are satisfied. In other words, when conditions 1) to 7) of Table 2 above are satisfied, the decoding apparatus may perform the true bi-prediction by applying the BDOF and when even any one of the conditions of Table 2 above is not satisfied, the decoding apparatus does not apply the BDOF.

As described above, some of the application conditions of the DMVR and the BDOF are the same and some are similar or different. In the conventional scheme, since condition check is performed for each technique even when the condition is the same, complexity for performing the bi-prediction increases. Therefore, the present disclosure proposes an efficient condition for applying the DMVR and the BDOF during the bi-prediction.

When the merge/skip mode is compared with the AMVP mode, the merge/skip mode has relatively lower accuracy than the AMVP mode, and as a result, refining the motion information by using the DMVR method is effective in terms of the performance. However, the BDOF mode may be applied even in the AMVP mode in addition to the merge/skip mode unlike the DMVR and as such, complexity for performing the BDOF compared with the performance may increase when applying the BDOF in the AMVP mode. Accordingly, the embodiment proposes a method for applying even the BDOF in the merge/skip mode similarly to the DMVR.

In this case, as an embodiment proposed in the present disclosure, the application condition of the BDOF may include conditions presented in Table 3 below.

TABLE 3 sps_bdof_enabled_flag is equal to 1.
merge_flag[ xCb ][ yCb ] is equal to 1.
predFlagL0[ xSbIdx ][ ySbIdx ] and predFlagL1[ xSbIdx ][ ySbIdx ]
are both equal to 1.
DiffPicOrderCnt( currPic, refPicList0[ refIdxL0 ] ) * DiffPicOrderCnt
( currPic, refPicList1[ refIdxL1 ] ) is less than 0.
MotionModelIdc[ xCb ][ yCb ] is equal to 0.
merge_subblock_flag[ xCb ][ yCb ] is equal to 0.
GbiIdx[ xCb ][ yCb ] is equal to 0.
cIdx is equal to 0.

Referring to Table 3 above, whether to apply the BDOF may be determined based on flag information (e.g., merge_flag) representing whether the inter prediction is performed by using the merge mode/skip mode. For example, when merge_flag is 1 (i.e., when the inter prediction is performed by using the merge mode/skip mode), it may be determined that a condition for whether to apply the merge mode/skip mode is satisfied. Accordingly, the BDOF may also be applied in the merge/skip mode similarly to the DMVR.

In other words, in the embodiment, together with a condition applied in the case of the merge/skip mode, whether to apply the BDOF may be determined based on a condition applied when the BDOF is enabled, a condition applied in the case of the bilateral prediction, a condition applied when the true bi-prediction is performed, a condition applied when the affine prediction is used, a condition applied when the subblock based merge mode is not applied, a condition applied when the GBi index is default, and a condition applied when the current block is the luma block.

Accordingly, the decoding apparatus may determine whether all conditions listed in Table 3 above are satisfied and when all conditions are satisfied, the decoding apparatus may perform the true bi-prediction by applying the BDOF. When even any of the conditions listed in Table 3 above is not satisfied, the decoding apparatus may not apply the BDOF. The encoding apparatus may also apply the conditions of Table 3 above and the encoding apparatus may perform the true bi-prediction by a corresponding method in the decoding apparatus.

The method for performing the true bi-prediction based on the conditions listed in Table 3 above may be independently applied to the DMVR and the BDOF or may be applied under the same condition for the DMVR and the BDOF.

Meanwhile, when the conditions listed in the embodiment are the same as the conditions described in Tables 1 and 2 above, a detailed operation or meaning is similarly applied, and as a result, a detailed description for each condition will be omitted. Further, duplicated contents even in embodiments to be described below will be omitted.

The encoding/decoding apparatus may be configured by various hardware and a preference of a ratio of complexity to performance may be different. Therefore, the embodiment proposes a method that may refine the motion information by applying the DMVR even in the AMVP mode in addition to the merge/skip mode.

In this case, as an embodiment proposed in the present disclosure, the application condition of the DMVR may include conditions presented in Table 4 below.

TABLE 4 sps_dmvr_enabled_flag is set to 1.
mmvd_flag[ xCb ][ yCb ] is equal to 0.
predFlagL0[0][0]=1 and predFlagL0[1][1]=1.
DiffPicOrderCnt (currPic, RefPicList0 [refIdxL0]) − DiffPicOrderCnt (currPic, RefPicList1 [ refIdxL1 ] ) is equal to 0.
CbHeight is greater than or equal to 8.
CbHeight*CbWidth is greater than or equal to 64.

Referring to Table 4 above, a process of determining whether to apply the DMVR may be omitted based on the flag information (e.g., merge_flag) representing whether the inter prediction is performed by using the merge mode/skip mode. As such, by omitting a condition for whether to apply the merge mode/skip mode, the DMVR may be applied even in the AMVP mode in addition to the merge mode/skip mode.

According to Table 4 above, whether to apply the DMVR may be determined based on a condition applied when the DMVR is enabled, a condition applied when the MMVD mode is not used, a condition applied in the case of the bilateral prediction, a condition applied in the case of the true bi-prediction in which the distances between the current picture and the bilateral reference pictures are the same as each other, a condition applied when the height of the current block is equal to or larger than 8, and a condition applied when the size (height*width) of the current block is equal to or larger than 64.

In other words, the decoding apparatus may determine whether all conditions listed in Table 4 above are satisfied and when all conditions are satisfied, the decoding apparatus may perform the true bi-prediction by applying the DMVR. When even any of the conditions listed in Table 4 above is not satisfied, the decoding apparatus may not apply the DMVR. The encoding apparatus may also apply the conditions of Table 4 above and the encoding apparatus may perform the true bi-prediction by a corresponding method in the decoding apparatus.

The method for performing the true bi-prediction based on the conditions listed in Table 4 above may be independently applied to the DMVR and the BDOF or may be applied under the same condition for the DMVR and the BDOF.

Meanwhile, as an embodiment of the present disclosure, both the DMVR and the BDOF may be applied to a normal merge mode. In other words, the DMVR and the BDOF may be applied when the advanced temporal motion vector prediction (ATMVP) mode is not used, the affine mode is not used, and the CPR is not used. In this case, the application condition of the DMVR may include conditions presented in Table 5 below.

TABLE 5 sps_dmvr_enabled_flag is set to 1.
merge_flag[ xCb ][ yCb ] is equal to 1.
mmvd_flag[ xCb ][ yCb ] is equal to 0.
predFlagL0[0][0]=1 and predFlagL0[1][1]=1.
DiffPicOrderCnt (currPic, RefPicList0 [refIdxL0]) − DiffPicOrderCnt (currPic, RefPicList1 [ refIdxL1 ] ) is equal to 0.
CbHeight is greater than or equal to 8.
CbHeight*CbWidth is greater than or equal to 64.
MotionModelIdc[ xCb ][ yCb ] is equal to 0. : !Affine
merge_subblock_flag[ xCb ][ yCb ] is equal to 0. : subblock && w >=8 && h>=8

Referring to Table 5 above, whether the condition applied when the affine mode is not used (e.g., when MotionModelIdc is 0) and the condition applied when the subblock based merge mode is not used (e.g., when merge_subblock_flag is 0) are satisfied is determined to apply the DMVR only in the normal merge mode.

Further, in the embodiment, together with the condition for whether the affine mode is used and the condition for whether the subblock based merge mode is used, whether to apply the DMVR may be determined based on the condition applied when the DMVR is enabled, the condition applied when the merge mode/skip mode is used, the condition applied when the MMVD mode is not used, the condition applied in the case of the bilateral prediction, the condition applied in the case of the true bi-prediction in which the distances between the current picture and the bilateral reference pictures are the same as each other, the condition applied when the height of the current block is equal to or larger than 8, and the condition applied when the size (height*width) of the current block is equal to or larger than 64.

In other words, the decoding apparatus may determine whether all conditions listed in Table 5 above are satisfied and when all conditions are satisfied, the decoding apparatus may perform the true bi-prediction by applying the DMVR. When even any of the conditions listed in Table 5 above is not satisfied, the decoding apparatus may not apply the DMVR. The encoding apparatus may also apply the conditions of Table 5 above and the encoding apparatus may perform the true bi-prediction by a corresponding method in the decoding apparatus.

The condition for whether to apply the subblock based merge mode (e.g., merge_subblock_flag) among the application conditions of Table 5 above includes a duplicated condition among the conventional DMVR application conditions. Accordingly, as an embodiment of the present disclosure, a condition duplicated with the condition (e.g., merge_subblock_flag) for whether to apply the subblock based merge mode may be removed. In this case, the corresponding condition may be removed as proposed in Table 6 below.

TABLE 6 sps_dmvr_enabled_flag is set to 1.
merge_flag[ xCb ][ yCb ] is equal to 1.
mmvd_flag[ xCb ][ yCb ] is equal to 0.
predFlagL0[0][0]=1 and predFlagL0[1][1]=1.
DiffPicOrderCnt (currPic, RefPicList0 [refIdxL0]) − DiffPicOrderCnt (currPic, RefPicList1 [ refIdxL1 ]) is equal to 0.
MotionModelIdc[ xCb ][ yCb ] is equal to 0. : !Affine
merge_subblock_flag[ xCb ][ yCb ] is equal to 0. : subblock &&
w >=8 && h>=8

Referring to Table 6 above, the subblock based merge mode may be applied when the size of the current block is equal to or larger than 8×8. Accordingly, since the condition (e.g., merge_subblock_flag=0) for whether to apply the subblock based merge mode includes a condition related to the size of the current block, conditions (e.g., CbHeight and CbHeight*CbWidth) related to the size of the current block among the application conditions of the conventional DMVR may be excluded. For example, the condition for whether the height of the current block is equal to or larger than 8 and the condition for whether the height*width of the current block is equal to or larger than 64 may be omitted and whether to apply the DMVR may be determined by using the remaining conditions listed in Table 6 above.

In other words, the decoding apparatus may determine whether all conditions listed in Table 6 above are satisfied and when all conditions are satisfied, the decoding apparatus may perform the true bi-prediction by applying the DMVR. When even any of the conditions listed in Table 6 above is not satisfied, the decoding apparatus may not apply the DMVR. The encoding apparatus may also apply the conditions of Table 6 above and the encoding apparatus may perform the true bi-prediction by a corresponding method in the decoding apparatus.

The method for performing the true bi-prediction based on the conditions listed in Table 5 or 6 above may be independently applied to the DMVR and the BDOF or may be applied under the same condition for the DMVR and the BDOF.

As an embodiment of the present disclosure, in order to increase the accuracy of the motion vector in low complexity, when the size of the block is small, the refinement techniques such as the DMVR and the BDOF may not be applied. In the conventional scheme, the refinement technique may be applied when the current block is a block which is equal to or larger than 8×8 and in the case of the DMVR of the refinement techniques, when the size of the current block is large, the refinement is applied by separating the current block into 16×16 units, and as a result, the DMVR may not be applied to a block which is smaller than 16×16. In this case, the application condition of the DMVR may include conditions presented in Table 7 below.

TABLE 7 sps_dmvr_enabled_flag is set to 1.
merge_flag[ xCb ][ yCb ] is equal to 1.
mmvd_flag[ xCb ][ yCb ] is equal to 0.
predFlagL0[0][0]=1 and predFlagL0[1][1]=1.
DiffPicOrderCnt (currPic, RefPicList0 [refIdxL0]) − DiffPicOrderCnt (currPic, RefPicList1 [ refIdxL1 ] ) is equal to 0.
CbHeight is greater than or equal to 16.
CbWidth is greater than or equal to 16.

Referring to Table 7 above, the DMVR may not be applied to the block which is smaller than 16×16 by changing the conditions (e.g., CbHeight and CbWidth) related to the size of the current block. For example, a condition applied when the height of the current block (e.g., CbHeight) is equal to or larger than 16 and a condition applied when the width of the current block (e.g., CbWidth) is equal to or larger than 16 may be used. When the application conditions related to the size of the current block are satisfied (i.e., when the size of the current block is equal to or larger than 16×16, the DMVR may be applied and when the application conditions related to the size of the current block are not satisfied (i.e., when the size of the current block is smaller than 16×16), the DMVR may not be applied.

Further, in the embodiment, together with the conditions (e.g., CbHeight and CbWidth) related to the size of the current block, whether to apply the DMVR may be determined based on the remaining application conditions listed in Table 7 above.

In other words, the decoding apparatus may determine whether all conditions listed in Table 7 above are satisfied and when all conditions are satisfied, the decoding apparatus may perform the true bi-prediction by applying the DMVR. When even any of the conditions listed in Table 7 above is not satisfied, the decoding apparatus may not apply the DMVR. The encoding apparatus may also apply the conditions of Table 7 above and the encoding apparatus may perform the true bi-prediction by a corresponding method in the decoding apparatus.

As an embodiment of the present disclosure, when the current block is the block which is smaller than 16×16, the BDOF may not be applied in addition to the DMVR. In this case, the application condition of the BDOF may include conditions presented in Table 8 below.

TABLE 8 sps_bdof_enabled_flag is equal to 1.
predFlagL0[ xSbIdx ][ ySbIdx ] and predFlagL1[ xSbIdx ][ ySbIdx ] are both equal to 1.
DiffPicOrderCnt( currPic, refPicList0[ refIdxL0 ] ) * DiffPicOrderCnt ( currPic, refPicList1[ refIdxL1 ] ) is less than 0.
MotionModelIdc[ xCb ][ yCb ] is equal to 0.
merge_subblock_flag[ xCb ][ yCb ] is equal to 0.
CbHeight is greater than or equal to 16
CbWidth is greater than or equal to 16
GbiIdx[ xCb ][ yCb ] is equal to 0.
cIdx is equal to 0.

Referring to Table 8 above, the BDOF may not be applied to the block which is smaller than 16×16 by changing the conditions (e.g., CbHeight and CbWidth) related to the size of the current block. For example, a condition applied when the height of the current block (e.g., CbHeight) is equal to or larger than 16 and a condition applied when the width of the current block (e.g., CbWidth) is equal to or larger than 16 may be used. When the application conditions related to the size of the current block are satisfied (i.e., when the size of the current block is equal to or larger than 16×16, the BDOF may be applied and when the application conditions related to the size of the current block are not satisfied (i.e., when the size of the current block is smaller than 16×16), the BDOF may not be applied.

Further, in the embodiment, together with the conditions (e.g., CbHeight and CbWidth) related to the size of the current block, whether to apply the BDOF may be determined based on the remaining application conditions listed in Table 8 above.

In other words, the decoding apparatus may determine whether all conditions listed in Table 8 above are satisfied and when all conditions are satisfied, the decoding apparatus may perform the true bi-prediction by applying the BDOF. When even any of the conditions listed in Table 8 above is not satisfied, the decoding apparatus may not apply the BDOF. The encoding apparatus may also apply the conditions of Table 8 above and the encoding apparatus may perform the true bi-prediction by a corresponding method in the decoding apparatus.

The method for performing the true bi-prediction based on the conditions listed in Table 7 or 8 above may be independently applied to the DMVR and the BDOF or may be applied under the same condition for the DMVR and the BDOF.

As described above, the DMVR is applied when the distances between the current picture and the bilateral reference pictures are the same as each other, while the BDOF is continuously applied in the case of the true bi-prediction even though the distances between the current picture and the bilateral reference pictures are different from each other. Accordingly, the present disclosure proposes a method that may integrally apply the condition related to the bilateral reference picture distance to the DMVR and the BDOF in order to increase coding efficiency.

As an embodiment proposed in the present disclosure, the application condition of the BDOF may include conditions presented in Table 9 below.

TABLE 9 sps_bdof_enabled_flag is equal to 1.
predFlagL0[ xSbIdx ][ ySbIdx ] and predFlagL1[ xSbIdx ][ ySbIdx ] are bothequal to 1.
DiffPicOrderCnt (currPic, RefPicList0 [refIdxL0]) − DiffPicOrderCnt (currPic, RefPicList1 [ refIdxL1 ] ) is equal to 0 : it is the True bi, and distances of bi-directional reference pictures are equal
MotionModelIdc[ xCb ][ yCb ] is equal to 0.
merge_subblock_flag[ xCb ][ yCb ] is equal to 0.
GbiIdx[ xCb ][ yCb ] is equal to 0.
cIdx is equal to 0.

Referring to Table 9 above, a condition related to the reference picture distance among the application conditions of the BDOF (e.g., DiffPicOrderCnt) is changed to similarly apply the corresponding condition to the DMVR and the BDOF. For example, whether DiffPicOrderCnt(currPic, RefPicList0 [refIdxL0])−DiffPicOrderCnt(currPic, RefPicList1 [refIdxL1]) is 0 is determined to determine whether a distance between the current picture and an L0 reference picture (i.e., a reference picture in the reference picture list L0) and a distance between the current picture and an L1 reference picture (i.e., a reference picture in the reference picture list L1) are the same as each other. In other words, the BDOF may be applied only when the distances between the current picture and the bilateral reference pictures are the same as each other. As such, as a condition in which the true bi-prediction is performed and the bilateral reference picture distances are the same as each other is added, a BDOF application range is limited, thereby saving decoding complexity.

Further, in the embodiment, together with the conditions (e.g., DiffPicOrderCnt) related to the reference picture distance, whether to apply the BDOF may be determined based on the remaining application conditions listed in Table 9 above.

In other words, the decoding apparatus may determine whether all conditions listed in Table 9 above are satisfied and when all conditions are satisfied, the decoding apparatus may perform the true bi-prediction by applying the BDOF. When even any of the conditions listed in Table 9 above is not satisfied, the decoding apparatus may not apply the BDOF. The encoding apparatus may also apply the conditions of Table 9 above and the encoding apparatus may perform the true bi-prediction by a corresponding method in the decoding apparatus.

As an embodiment proposed in the present disclosure, the application condition of the DMVR may include conditions presented in Table 10 below.

TABLE 10 sps_dmvr_enabled_flag is set to 1.
merge_flag[ xCb ][ yCb ] is equal to 1.
mmvd_flag[ xCb ][ yCb ] is equal to 0.
predFlagL0[0][0]=1 and predFlagL0[1][1]=1.
DiffPicOrderCnt( currPic, refPicList0[ refIdxL0 ] ) * DiffPicOrderCnt (currPic, refPicList1[ refIdxL1 ] ) is less than 0. : TrueBi
CbHeight is greater than or equal to 8
CbHeight*CbWidth is greater than or equal to 64

Referring to Table 10 above, a condition related to the reference picture distance among the application conditions of the DMVR (e.g., DiffPicOrderCnt) is changed to similarly apply the corresponding condition to the DMVR and the BDOF. For example, it is determined whether DiffPicOrderCnt(currPic, refPicList0[refIdxL0])*DiffPicOrderCnt (currPic, refPicList1[refIdxL1]) is smaller 0 to determine whether a true bi-prediction is performed in which the bilateral reference pictures are located in different directions based on the current picture. In other words, the DMVR may be continuously applied in the case of the true bi-prediction even though the distances between the current picture and the bilateral reference pictures are not the same as each other. As such, as the condition for whether the true bi-prediction is performed is applied, a motion vector derived by considering the decoding complexity may be used without scaling even when the bilateral reference picture distances are different.

Further, in the embodiment, together with the condition (e.g., DiffPicOrderCnt) related to the reference picture distance, whether to apply the DMVR may be determined based on the remaining application conditions listed in Table 10 above.

In other words, the decoding apparatus may determine whether all conditions listed in Table 10 above are satisfied and when all conditions are satisfied, the decoding apparatus may perform the true bi-prediction by applying the DMVR. When even any of the conditions listed in Table 10 above is not satisfied, the decoding apparatus may not apply the DMVR. The encoding apparatus may also apply the conditions of Table 10 above and the encoding apparatus may perform the true bi-prediction by a corresponding method in the decoding apparatus.

The method for performing the true bi-prediction based on the conditions listed in Table 9 or 10 above may be independently applied to the DMVR and the BDOF or may be applied under the same condition for the DMVR and the BDOF.

Meanwhile, in each reference block, a case where motion compensation is performed by a weighted sum by a change in light may occur. In this case, since a phenomenon may be determined by GBi or local illumination compensation (LIC), the application conditions of the DMVR and the BDOF may be determined by considering the GBi or LIC condition.

As an embodiment of the present disclosure, proposed is a method for determining whether to apply the DMVR by considering the GBi and LIC conditions. In this case, the application condition of the DMVR may include conditions presented in Table 11 below.

TABLE 11 sps_dmvr_enabled_flag is set to 1.
merge_flag[ xCb ][ yCb ] is equal to 1.
mmvd_flag[ xCb ][ yCb ] is equal to 0.
predFlagL0[0][0]=1 and predFlagL0[1][1]=1.
DiffPicOrderCnt (currPic, RefPicList0 [refIdxL0]) − DiffPicOrderCnt (currPic, RefPicList1 [ refIdxL1 ] ) is equal to 0.
CbHeight is greater than or equal to 8.
CbHeight*CbWidth is greater than or equal to 64.
GbiIdx[ xCb ][ yCb ] is equal to 0.
LICFlag is equal to 0.

Referring to Table 11, it is possible to determine whether to apply the DMVR by adding a GBi condition (e.g., GbiIdx) and an LIC condition (e.g., LICFlag). Here, the GBi may represent a generalized bi-prediction capable of applying different weights to the L0 prediction and the L1 prediction, and for example, represent the generalized bi-prediction using the GbiIdx. The GbiIdx may exist in case of the bi-prediction, and represent a bi-prediction weight index. For example, the GbiIdx may be derived from a neighboring block in the merge mode, or signaled from the encoding apparatus to the decoding apparatus through a GbiIdx syntax element (e.g., gbi_idx) in the MVP mode. As an example, the GbiIdx may indicate a weight of w applied to the L1 prediction, and in this case, a weight of (1-w) may be applied to the L0 prediction. As another example, the GbiIdx may indicate the weight of w applied to the L0 prediction, and in this case, the weight of (1-w) may be applied to the L1 prediction.

According to Table 11, if the GbiIdx is 0 (i.e., if the GbiIdx is a default), it may be determined to satisfy the GBi condition, and if the LICFlag is 0 (i.e., if the LIC exists, it may be determined to satisfy the LIC condition.

Further, in the embodiment, together with the GBi condition (e.g., GbiIdx) and the LIC condition (e.g., LICFlag), whether to apply the DMVR may be determined based on the remaining application conditions listed in Table 11 above.

In other words, the decoding apparatus may determine whether all conditions listed in Table 11 above are satisfied and when all conditions are satisfied, the decoding apparatus may perform the true bi-prediction by applying the DMVR. When even any of the conditions listed in Table 11 above is not satisfied, the decoding apparatus may not apply the DMVR. The encoding apparatus may also apply the conditions of Table 11 above and the encoding apparatus may perform the true bi-prediction by a corresponding method in the decoding apparatus.

As an embodiment of the present disclosure, proposed is a method for determining whether to apply the BDOF by considering the GBi and LIC conditions. In this case, the application condition of the BDOF may include conditions presented in Table 12 below.

TABLE 12 sps_bdof_enabled_flag is equal to 1.
predFlagL0[ xSbIdx ][ ySbIdx ] and predFlagL1[ xSbIdx ][ ySbIdx ] are both equal to 1.
DiffPicOrderCnt( currPic, refPicList0[ refIdxL0 ] ) * DiffPicOrderCnt ( currPic, refPicList1[ refIdxL1 ] ) is less than 0.

TABLE 12-continued

MotionModelIdc[ xCb ][ yCb ] is equal to 0.
merge_subblock_flag[ xCb ][ yCb ] is equal to 0.
GbiIdx[ xCb ][ yCb ] is equal to 0.
LICFlag is equal to 0.
cIdx is equal to 0.

According to Table 12 above, whether to apply the BDOF may be determined by adding an LIC condition (e.g., LICFlag) together with the conventional GBi condition (e.g., GbiIdx). For example, when GbiIdx is 0 (i.e., when GbiIdx is default), it is determined that the condition for whether GBi exists is satisfied and when LICFlag is 0 (i.e., when LIC exists), it may be determined that a condition for whether LIC exists is satisfied.

Accordingly, in the embodiment, together with the GBi condition (e.g., GbiIdx) and the LIC condition (e.g., LICFlag), whether to apply the BDOF may be determined based on the remaining application conditions listed in Table 12 above.

In other words, the decoding apparatus may determine whether all conditions listed in Table 12 above are satisfied and when all conditions are satisfied, the decoding apparatus may perform the true bi-prediction by applying the BDOF. When even any of the conditions listed in Table 12 above is not satisfied, the decoding apparatus may not apply the BDOF. The encoding apparatus may also apply the conditions of Table 12 above and the encoding apparatus may perform the true bi-prediction by a corresponding method in the decoding apparatus.

The method for performing the true bi-prediction based on the conditions listed in Table 11 or 12 above may be independently applied to the DMVR and the BDOF or may be applied under the same condition for the DMVR and the BDOF.

Meanwhile, since the DMVR and the BDOF derive the motion information through the refinement process in the decoding apparatus, a decoding complexity problem occurs. Accordingly, the present disclosure proposes a method that may reduce the decoding complexity by allowing whether to apply the DMVR and the BDOF to be determined by using the merge index. In this case, since both the DMVR and the BDOF perform refinement of the motion vector in a limited range, an effect of refinement may be reduced when the motion vector is inaccurate. Accordingly, the present disclosure proposes a method that may limitatively apply the DMVR and the BDOF only when a value indicating the merge index is small by considering efficiency of the refinement.

Here, the merge index may be a syntax element signaled from the encoding apparatus to the decoding apparatus. For example, the encoding/decoding apparatus may configure the merge candidate list based on the neighboring blocks of the current block when the merge mode/skip mode is applied to the current block. In this case, the encoding apparatus may select an optimal merge candidate among the merge candidates included in the merge candidate list based on rate-distortion (RD) cost and signal merge index information indicating the selected merge candidate to the decoding apparatus. The decoding apparatus may select the merge candidate applied to the current block based on the merge candidate list and the merge index information.

As an embodiment of the present disclosure, a method for determining whether to apply the DMVR by using the merge index may include conditions presented in Table 13 below.

TABLE 13 sps_dmvr_enabled_flag is set to 1.
merge_flag[ xCb ][ yCb ] is equal to 1.
mmvd_flag[ xCb ][ yCb ] is equal to 0.
merge_idx[ xCb ][ yCb ] < 2.
predFlagL0[0][0]=1 and predFlagL0[1][1]=1.
DiffPicOrderCnt (currPic, RefPicList0 [refIdxL0]) − DiffPicOrderCnt (currPic, RefPicList1 [ refIdxL1 ] ) is equal to 0.
CbHeight is greater than or equal to 8.
CbHeight*CbWidth is greater than or equal to 64.

Referring to Table 13 above, whether to apply the DMVR may be determined by adding a merge index condition (e.g., merge_idx). For example, when the merge index (e.g., merge_idx) is smaller than 2, it may be determined that the merge index condition is satisfied. Here, a value (threshold) of the merge index may be set to 2, but this is just one example and the corresponding value may be changed according to the coding efficiency.

Accordingly, in the embodiment, together with the merge index condition (e.g., merge_idx), whether to apply the DMVR may be determined based on the remaining application conditions listed in Table 13 above.

In other words, the decoding apparatus may determine whether all conditions listed in Table 13 above are satisfied and when all conditions are satisfied, the decoding apparatus may perform the true bi-prediction by applying the DMVR. When even any of the conditions listed in Table 13 above is not satisfied, the decoding apparatus may not apply the DMVR. The encoding apparatus may also apply the conditions of Table 13 above and the encoding apparatus may perform the true bi-prediction by a corresponding method in the decoding apparatus.

As an embodiment of the present disclosure, a method for determining whether to apply the BDOF by using the merge index may include conditions presented in Table 14 below.

TABLE 14 sps_bdof_enabled_flag is equal to 1.
predFlagL0[ xSbIdx ][ ySbIdx ] and predFlagL1[ xSbIdx ][ ySbIdx ] are both equal to 1.
DiffPicOrderCnt( currPic, refPicList0[ refIdxL0 ] ) * DiffPicOrderCnt ( currPic, refPicList1[ refIdxL1 ] ) is less than 0.
MotionModelIdc[ xCb ][ yCb ] is equal to 0.
merge_subblock_flag[ xCb ][ yCb ] is equal to 0.
GbiIdx[ xCb ][ yCb ] is equal to 0.
!(merge_flag[ xCb ][ yCb ] is equal to 1 && merge_idx[ xCb ] [ yCb ] >= 2)
cIdx is equal to 0.

Referring to Table 14 above, whether to apply the BDOF may be determined by adding the condition for whether the merge mode/skip mode is applied (e.g., merge_flag) and the merge index condition (e.g., merge_idx). For example, when merge_flag is not 1 (i.e., when the inter prediction is performed by using the merge mode/skip mode) and merge_idx is not equal to or larger than 2, only if the value of the merge index is small, it may be determined that the condition for limitatively applying the BDOF is satisfied. In other words, when merge_flag is 1 (i.e., when the inter prediction is performed by using the merge mode/skip mode) and merge_idex is smaller than 2, only if the value of the merge index is small, it may be determined that the merge index condition is satisfied and the BDOF may be applied. Here, the value (threshold) of the merge index may be set to 2, but this is just one example and the corresponding value may be changed according to the coding efficiency.

In other words, in the embodiment, together with the condition for whether the merge mode/skip mode is applied (e.g., merge_flag) and the merge index condition (e.g., merge_idx), whether to apply the BDOF may be determined based on the remaining application conditions listed in Table 14 above.

In other words, the decoding apparatus may determine whether all conditions listed in Table 14 above are satisfied and when all conditions are satisfied, the decoding apparatus may perform the true bi-prediction by applying the BDOF. When even any of the conditions listed in Table 14 above is not satisfied, the decoding apparatus may not apply the BDOF. The encoding apparatus may also apply the conditions of Table 14 above and the encoding apparatus may perform the true bi-prediction by a corresponding method in the decoding apparatus.

The method for performing the true bi-prediction based on the conditions listed in Table 13 or 14 above may be independently applied to the DMVR and the BDOF or may be applied under the same condition for the DMVR and the BDOF.

Meanwhile, in the merge/skip mode, the motion information may be refined through the MMVD and in this case, since the decoding complexity increases, the DMVR is not performed when the MMVD is applied. However, when the DMVR is applied without considering the MMVD, the DMVR may be applied without the MMVD condition by considering performance enhancement. In this case, according to an embodiment of the present disclosure, the application condition of the DMVR may include conditions presented in Table 15 below.

TABLE 15 sps_dmvr_enabled_flag is set to 1.
merge_flag[ xCb ][ yCb ] is equal to 1.
predFlagL0[0][0]=1 and predFlagL0[1][1]=1.
DiffPicOrderCnt (currPic, RefPicList0 [refIdxL0]) − DiffPicOrderCnt (currPic, RefPicList1 [ refIdxL1 ] ) is equal to 0.
CbHeight is greater than or equal to 8.
CbHeight*CbWidth is greater than or equal to 64.

Referring to Table 15 above, a condition (e.g., mmvd_flag) for whether to apply the MMVD mode among the application conditions of the conventional DMVR may be excluded. In other words, a process of determining whether mmvd_flag is 0 (i.e., whether the MMVD mode is not used) may be omitted and whether to apply the DMVR may be determined based on the conditions listed in Table 15 above.

In other words, the decoding apparatus may determine whether all conditions listed in Table 15 above are satisfied (excluding the condition (e.g., mmvd_flag) for whether to apply the MMVD mode) and when all conditions are satisfied, the decoding apparatus may perform the true bi-prediction by applying the DMVR. When even any of the conditions listed in Table 15 above is not satisfied, the decoding apparatus may not apply the DMVR. The encoding apparatus may also apply the conditions of Table 15 above and the encoding apparatus may perform the true bi-prediction by a corresponding method in the decoding apparatus.

Further, contrary to the embodiment of Table 15 described above, when the motion information is refined through the MMVD in the merge/skip mode, whether to perform the BDOF may be determined by considering the decoding complexity. Accordingly, the present disclosure proposes a method for determining whether to apply the BDOF by considering the MMVD condition. In this case, according to an embodiment of the present disclosure, the application condition of the BDOF may include conditions presented in Table 16 below.

TABLE 16 sps_bdof_enabled_flag is equal to 1.
predFlagL0[ xSbIdx ][ ySbIdx ] and predFlagL1[ xSbIdx ][ ySbIdx ] are both equal to 1.
DiffPicOrderCnt( currPic, refPicList0[ refIdxL0 ] ) * DiffPicOrderCnt ( currPic, refPicList1[ refIdxL1 ] ) is less than 0.
MotionModelIdc[ xCb ][ yCb ] is equal to 0.
merge_subblock_flag[ xCb ][ yCb ] is equal to 0.
GbiIdx[ xCb ][ yCb ] is equal to 0.
mmvd_flag[ xCb ][ yCb ] is equal to 0
cIdx is equal to 0.

Referring to Table 16 above, the BDOF may not be applied when the motion information is refined through the MMVD by adding the condition (e.g., mmvd_flag) for whether to apply the MMVD mode. For example, when mmvd_flag is 0 (i.e., when the MMVD mode is not used), it may be determined that the condition for whether to apply the MMVD mode is satisfied.

Accordingly, in the embodiment, together with the condition (e.g., mmvd_flag) for whether to apply the MMVD mode, whether to apply the BDOF may be determined based on the remaining application conditions listed in Table 16 above.

In other words, the decoding apparatus may determine whether all conditions listed in Table 16 above are satisfied and when all conditions are satisfied, the decoding apparatus may perform the true bi-prediction by applying the BDOF. When even any of the conditions listed in Table 16 above is not satisfied, the decoding apparatus may not apply the BDOF. The encoding apparatus may also apply the conditions of Table 16 above and the encoding apparatus may perform the true bi-prediction by a corresponding method in the decoding apparatus.

The method for performing the true bi-prediction based on the conditions listed in Table 15 or 16 above may be independently applied to the DMVR and the BDOF or may be applied under the same condition for the DMVR and the BDOF.

Meanwhile, in the case of the AMVP, an Adaptive Motion Vector Resolution (AMVR) technique may be applied. In this case, when a resolution of the motion vector is high, i.e., when an integer-pel rounding or 4 integer-pel rounding is provided, it may not be appropriate to apply the technique in the case of the BDOF of performing the refinement in the limited area. Accordingly, the present disclosure proposes a method that may determine performing the BDOF according to the AMVR condition. In this case, according to an embodiment of the present disclosure, the application condition of the BDOF may include conditions presented in Table 17 below.

TABLE 17 sps_bdof_enabled_flag is equal to 1.
predFlagL0[ xSbIdx ][ ySbIdx ] and predFlagL1[ xSbIdx ][ ySbIdx ] are both equal to 1.
DiffPicOrderCnt( currPic, refPicList0[ refIdxL0 ] ) * DiffPicOrderCnt ( currPic, refPicList1[ refIdxL1 ] ) is less than 0.
MotionModelIdc[ xCb ][ yCb ] is equal to 0.
merge_subblock_flag[ xCb ][ yCb ] is equal to 0.
amvr_flag != 0
GbiIdx[ xCb ][ yCb ] is equal to 0.
cIdx is equal to 0.

Referring to Table 17 above, whether to apply the BDOF may be determined by adding the AMVR condition (e.g., amvr_flag). Here, amvr_flag may be information representing the solution of a motion vector difference (MVD). For example, in a case where amvr_flag is 0, the case may indicate that the resolution of the MVD is derived in units of ¼ sample (quarter-luma-sample) and in a case where amvr_flag is not 0, the case may indicate that the resolution of the MVD is derived in units of integer-luma-sample or four-luma-sample. Alternatively, a reverse case thereto may be determined. According to an embodiment, as presented in Table 20 above, in the case where amvr_flag is not 0, the condition that the BDOF is applied may be set. In other words, in the case where amvr_flag is 0, the BDOF may be limited not to be applied.

Accordingly, in the embodiment, together with the AMVR condition (e.g., amvr_flag), whether to apply the BDOF may be determined based on the remaining application conditions listed in Table 17 above.

In other words, the decoding apparatus may determine whether all conditions listed in Table 17 above are satisfied and when all conditions are satisfied, the decoding apparatus may perform the true bi-prediction by applying the BDOF. When even any of the conditions listed in Table 17 above is not satisfied, the decoding apparatus may not apply the BDOF. The encoding apparatus may also apply the conditions of Table 17 above and the encoding apparatus may perform the true bi-prediction by a corresponding method in the decoding apparatus.

Meanwhile, the DMVR and the BDOF may be each signaled in a sequence parameter set (SPS) syntax. Table 18 below shows one example of a syntax element indicating whether the DMVR signaled through the SPS syntax is enabled and whether the BDOF is enabled.

TABLE 18

| seq_parameter_set_rbsp( ) { | Descriptor |
|---|---|
| ...... | ...... |
| sps_dmvr_enabled_flag | u(1) |
| sps_bdof_enabled_flag | u(1) |
| ...... | ...... |
| } | |

Referring to Table 18 above, sps_dmvr_enabled_flag may be signaled in the SPS syntax and whether true bi-prediction based DMVR is enabled may be represented based on the syntax element. For example, in a case where sps_dmvr_enabled_flag is 1, the case may indicate that the true bi-prediction based DMVR is enabled and in a case where sps_dmvr_enabled_flag is 0, the case may indicate that the true bi-prediction based DMVR is not enabled.

Further, sps_bdof_enabled_flag may be signaled in the SPS syntax and whether true bi-prediction based BDOF is enabled may be represented based on the syntax element. For example, in a case where sps_bdof_enabled_flag is 1, the case may indicate that the true bi-prediction based BDOF is enabled and in a case where sps_bdof_enabled_flag is 0, the case may indicate that the true bi-prediction based BDOF is not enabled.

As shown in Table 18, the application conditions of the DMVR and the BDOF may be checked by using a syntax element (e.g., sps_dmvr_enabled_flag) representing whether the DMVR is enabled and a syntax element (e.g., sps_bdof_enabled_flag) representing whether the BDOF is enabled.

Figure 5:
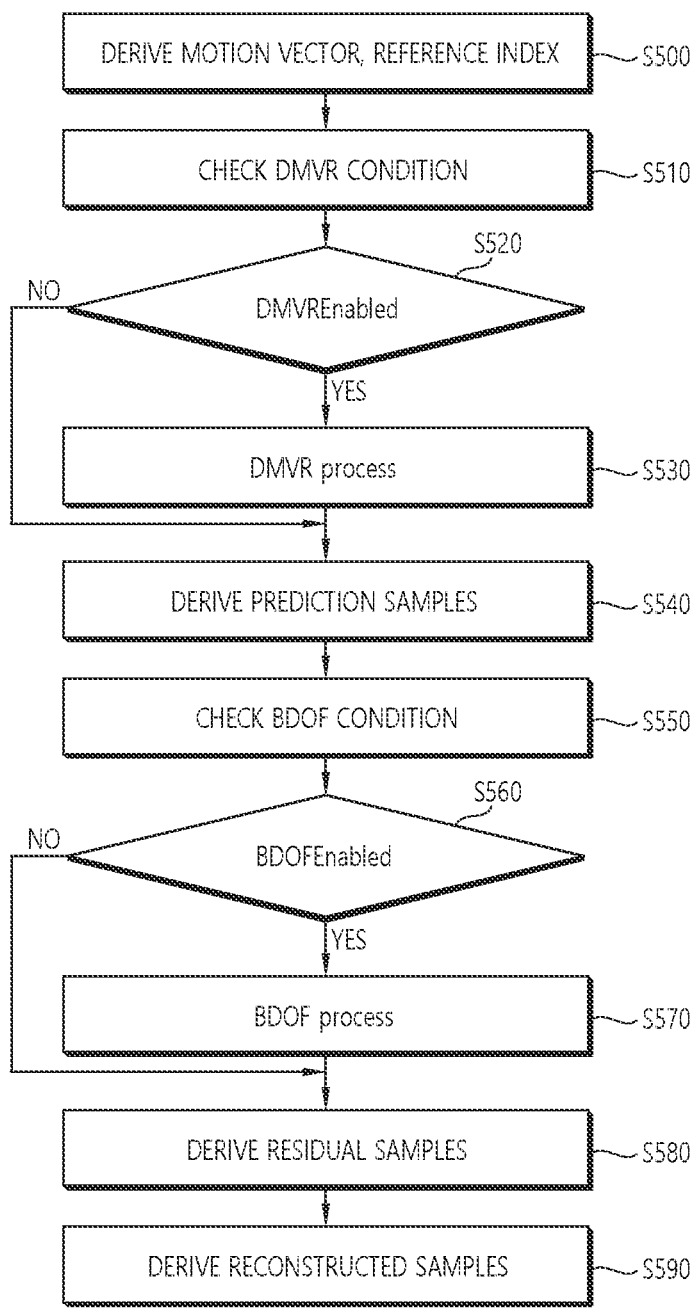
FIG. 5 is an example illustrating a method for performing a decoding process by checking application conditions of the DMVR and a BDOF.

FIG. 5 illustrates one example illustrating a method for performing a decoding process by checking application conditions of a DMVR and a BDOF.

As shown in Table 18, the method of FIG. 5 may be applied when using a syntax element (e.g., sps_dmvr_enabled_flag) representing whether the DMVR is enabled and a syntax element (e.g., sps_bdof_enabled_flag) representing whether the BDOF is enabled.

Referring to FIG. 5, the decoding apparatus may derive motion information (e.g., a motion vector, a reference picture index, etc.) for a current block (S500).

The decoding apparatus may check an application of the DMVR (S510). In this case, the application condition of the DMVR may be checked based on the syntax element (e.g., sps_dmvr_enabled_flag) representing whether the DMVR is enabled. For example, when the DMVR is enabled (e.g., when sps_dmvr_enabled_flag is 1), the application condition of the DMVR may be checked.

The decoding apparatus may determine whether to apply a DMVR process according to whether the application condition of the DMVR is satisfied (S520).

When all application conditions of the DMVR are satisfied, the decoding apparatus may derive refined motion information by applying the DMVR process (S530). When at least one of the application conditions of the DMVR is not satisfied, the decoding apparatus may not apply the DMVR process.

The decoding apparatus may derive prediction samples of the current block based on motion information derived (not refined) when refined motion information or DMVR derived when applying the DMVR is not applied (S540).

In addition, the decoding apparatus may check an application condition of the BDOF (S550). In this case, the application condition of the BDOF DMVR may be checked based on the syntax element (e.g., sps_bdof_enabled_flag) representing whether the BDOF is enabled. For example, when the DMVR is enabled (e.g., when sps_bdof_enabled_flag is 1), the application condition of the DMVR may be checked.

When all application conditions of the BDOF are satisfied, the decoding apparatus may refine prediction samples by applying the BDOF process (S570). When at least one of the application conditions of the BDOF is not satisfied, the decoding apparatus may not apply the BDOF process.

The decoding apparatus may derive the residual samples for the current block (S580) and derive reconstructed samples based on the refined prediction samples derived when applying the residual samples and the BDOF or prediction samples (not refined) derived when not applying the BDOF (S590).

The present disclosure proposes various embodiments that may enhance coding efficiency and reduce complexity by harmonizing mutual application conditions of the DMVR and the BDOF at the time of applying the DMVR and the BDOF as described above. In checking the application conditions of the DMVR and the BDOF according to the embodiments of the present disclosure and applying the application conditions to a decoding process, respective conditions may be separately checked and applied, but the application conditions may be checked at once in order to enhance the coding efficiency. In other words, the present disclosure proposes a method that may integrate and check the application conditions of the DMVR and the BDOF at once.

As an embodiment of the present disclosure, information (e.g.,) indicating whether to apply the refinement in the decoding apparatus in the sequence parameter set (SPS) syntax is signaled to perform a process of checking the application condition of the DMVR/BDOF. Next, Table 19 shows one example of a syntax element (e.g., sps_refinement_enabled_flag) representing whether to apply the refinement in the decoding apparatus signaled through the SPS syntax.

TABLE 19

| seq_parameter_set_rbsp( ) { | Descriptor |
|---|---|
| ...... | ...... |
| sps_refinement_enabled_flag | u(1) |
| if(sps_refinement_enabled_flag) { | |
| sps_dmvr_enabled_flag | u(1) |
| sps_bdof_enabled_flag | u(1) |
| } | |
| ...... | ...... |
| } | |

Referring to Table 19 above, sps_refinement_enabled_flag may be signaled in the SPS syntax and may represent whether the refinement is applicable in the decoding apparatus based on the syntax element. For example, when sps_refinement_enabled_flag exists (i.e., when sps_refinement_enabled_flag is true), it may be determined that the refinement is applicable in the decoding apparatus. In this case, the decoding apparatus obtains the sps_dmvr_enabled_flag syntax element representing whether the DMVR is enabled and the sps_bdof_enabled_flag syntax element representing whether the BDOF is enabled to determine the application conditions of the DMVR and the BDOF.

Figure 6:
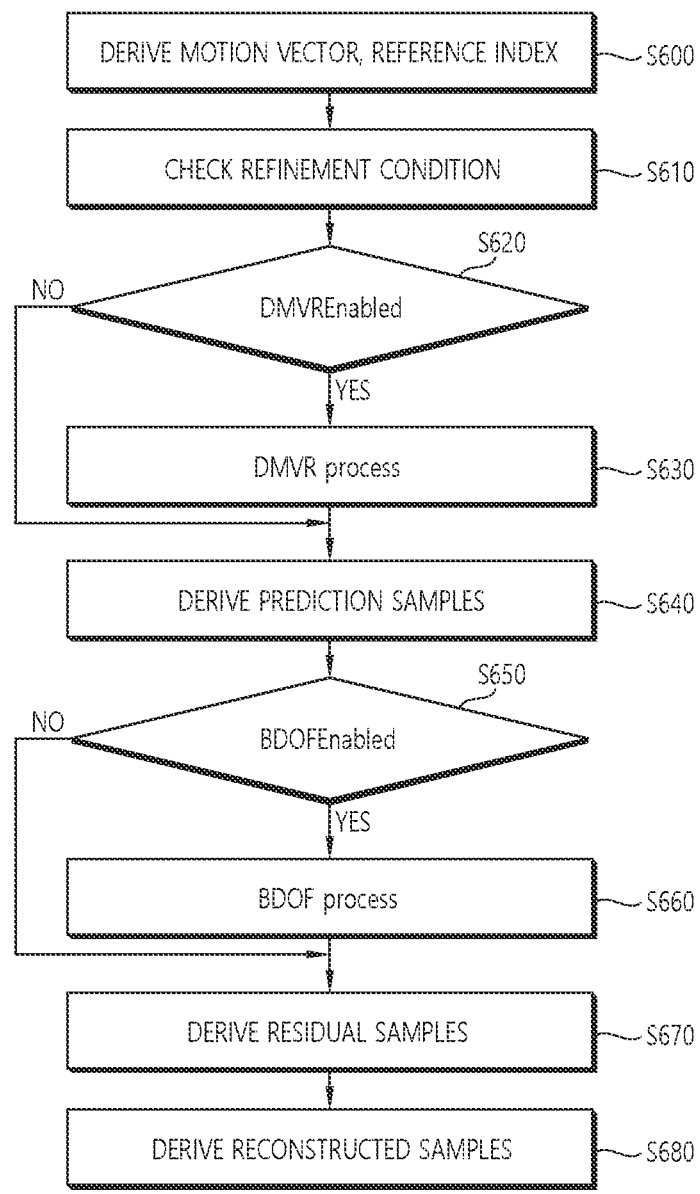
FIGS. 6 and 7 are another example illustrating a method for performing the decoding process by checking the application conditions of the DMVR and the BDOF.
Figure 7:
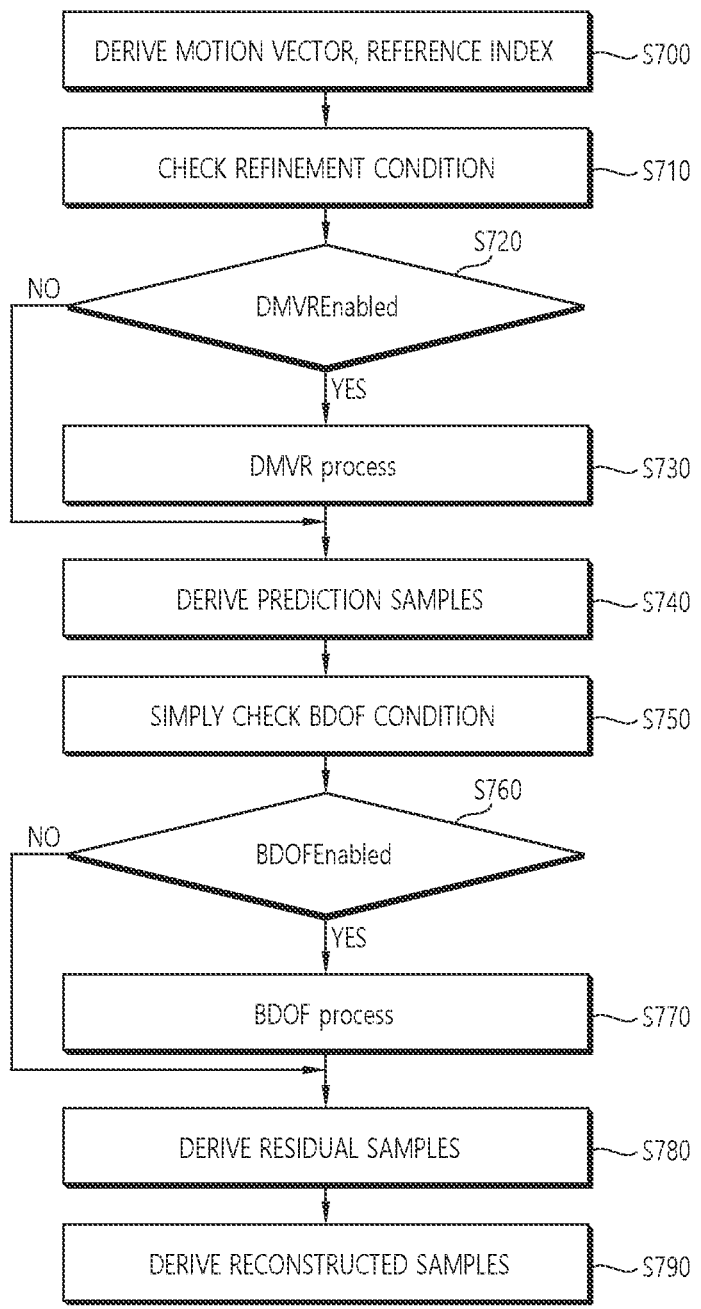

FIGS. 6 and 7 illustrate another example illustrating a method for performing a decoding process by checking application conditions of a DMVR and a BDOF.

The method of FIG. 6 and the method of FIG. 7 may be applied when the syntax element (e.g., sps_refinement_enabled_flag) representing whether the refinement is applicable in the decoding apparatus is used as shown in Table 19 above. Further, description of duplicated contents of FIGS. 6 and 7 with FIG. 5 described above will be omitted.

Referring to FIG. 6, it can be seen that the application conditions are checked at once in the previous stage without checking the respective application conditions of the DMVR and the BDOF by comparing with the process of FIG. 5 above. As an embodiment, in step S610 of FIG. 6, the decoding apparatus may check a refinement application condition. In this case, the refinement application condition may be checked based on sps_refinement_enabled_flag shown in Table 19 above. For example, the decoding apparatus may obtain the sps_dmvr_enabled_flag syntax element representing whether the DMVR is enabled and the sps_bdof_enabled_flag syntax element representing whether the BDOF is enabled when sps_refinement_enabled_flag is 1 and check the application conditions of the DMVR and the BDOF based on the obtained syntax elements.

Further, referring to FIG. 7, the application conditions are checked at once in the previous stage without checking the respective application conditions of the DMVR and the BDOF by comparing with the process of FIG. 5 above and a simple checking process (the application condition of the BDOF) may be performed with respect to a different condition. As an embodiment, in step S710 of FIG. 7, the decoding apparatus may check the refinement application condition. Thereafter, in step S750 of FIG. 7, the decoding apparatus may additionally simply check the application condition of the BDOF having a condition different from the refinement application condition.

The aforementioned methods listed in Tables 3 to 17 according to the exemplary embodiment of the present document may be applied in combination. In other words, it may be determined whether to apply the DMVR and the BDOF by checking the refine application condition, and it is possible to apply the conditions expressed in Table 20 below.

TABLE 20

| | |
|---|---|
| DMVR | sps_dmvr_enabled_flag is set to 1. |
| | merge_flag[ xCb ][ yCb ] is equal to 1. |
| | mmvd_flag[ xCb ][ yCb ] is equal to 0. |
| | predFlagL0[0][0]=1 and predFlagL[1][1]=1. |
| | DiffPicOrderCnt (currPic, RefPicList0 [refIdxL0]) |
| | DiffPicOrderCnt (currPic, RefPicList1 [ refIdxL1 ] ) is equal to 0. |
| | CbHeight is greater than or equal to 8. |
| | CbHeight*CbWidth is greater than or equal to 64. |
| BDOF | sps_bdof_enabled_flag is equal to 1. |
| | predFlagL0[ xSbIdx ][ ySbIdx ] and predFlagL1[ xSbIdx ][ ySbIdx ] are both equal to 1. |
| | DiffPicOrderCnt( currPic, refPicList0[refIdxL0 ] ) * DiffPicOrderCnt( currPic, refPicList1[ refIdxL1 ]) is less than 0. |
| | MotionModelIdc[ xCb ][ yCb ] is equal to 0. |
| | merge_subblock_flag[ xCb ][ yCb ] is equal to 0. |
| | GbiIdx[ xCb ][ yCb ] is equal to 0. |
| | cIdx is equal to 0. |
| DMVR | predFlagL0[0][0]=1 and predFlagL0[1][1]=1. |
| BDOF | DiffPicOrderCnt (currPic, RefPicList0 [refIdxL0]) |
| | DiffPicOrderCnt (currPic, RefPicList1 [ refIdxL1 ]) is equal to 0. |
| | mmvd_flag[ xCb ][ yCb ] is equal to 0. |
| | MotionModelIdc[ xCb ][ yCb ] is equal to 0. |
| | merge_subblock_flag[ xCb ][ yCb ] is equal to 0. |
| | GbiIdx[ xCb ][ yCb ] is equal to 0. |

Referring to Table 20, when the DMVR or the BDOF is applied, it is possible to use a condition applied to a case of the bi-directional prediction, a condition applied to case of the true bi-prediction in which distances between the current picture and the bi-directional reference pictures are equal to each other, a condition applied to a case where the MMVD mode is not used, a condition applied to a case where it is not the affine prediction, a condition applied to a case where it is not a subblock-based merge mode, and a condition applied to a case where the GBi index is a default. In other words, it is possible to determine whether to apply the DMVR or the BDOF according to whether to satisfy the conditions.

Further, as described above, a condition of determining whether it is the merge mode for the DMVR, determining whether it is the luma block for the BDOF, or the like may also be added.

The application conditions listed in Table 20 is one example, and it is apparent that various conditions listed in the aforementioned exemplary embodiments (exemplary embodiments in Tables 3 to 17) may be used in combination.

FIG. 8 is a flowchart schematically illustrating an encoding method which may be performed by the encoding apparatus according to the exemplary embodiment of the present document.

A method illustrated in FIG. 8 may be performed by the encoding apparatus 200 illustrated in FIG. 2. Specifically, steps S800 to S830 in FIG. 8 may be performed by the predictor 220 and the inter predictor 221 illustrated in FIG. 2, steps S840 and S850 in FIG. 8 may be performed by the residual processor 230 illustrated in FIG. 2, and a step S860 in FIG. 8 may be performed by the entropy encoder 240 illustrated in FIG. 2. Further, the method illustrated in FIG. 8 may include the aforementioned exemplary embodiments in the present document. Therefore, in FIG. 8, a specific description of contents overlapping the aforementioned exemplary embodiments will be omitted and simplified.

Referring to FIG. 8, the encoding apparatus may derive the motion vector of the current block (S800).

As an example, when preforming the inter prediction for the current block, the encoding apparatus may derive the motion information (the motion vector, the reference picture index, and the like) of the current block. For example, the encoding apparatus may search for the block similar to the current block in the certain region (search region) of the reference pictures through the motion estimation, and derive the reference block in which a difference from the current block is a minimum or a certain standard or less. Based on the above, the encoding apparatus may derive the reference picture index indicating the reference picture at which the reference block is positioned, and derive the motion vector based on a position difference between the reference block and the current block.

Further, the encoding apparatus may determine the inter prediction mode applied to the current block among various prediction modes. The encoding apparatus may compare the RD costs for various prediction modes and determine an optimal prediction mode for the current block.

For example, the encoding apparatus may construct the merge candidate list if the skip mode or the merge mode is applied to the current block. At this time, the encoding apparatus may derive the reference block in which the difference from the current block is the minimum or the certain standard or less among the reference blocks indicated by the merge candidates included in the merge candidate list. In this case, the merge candidate associated with the derived reference block may be selected, and the merge index information indicating the selected merge candidate may be generated and signaled to the decoding apparatus. The motion information of the current block may be derived using the motion information of the selected merge candidate.

As another example, if the (A)MVP mode is applied to the current block, the encoding apparatus may construct the (A)MVP candidate list, and use the motion vector of the selected mvp candidate among motion vector predictor (mvp) candidates included in the (A)MVP candidate list as the mvp of the current block. For example, the aforementioned motion vector indicating the reference block derived by the motion estimation may be used as the motion vector of the current block, and at this time, the mvp candidate having the motion vector with the smallest difference from the motion vector of the current block derived by the motion estimation may be selected from the mvp candidates. Further, the encoding apparatus may derive the motion vector difference (MVD) which is a difference obtained by subtracting the motion vector of the selected mvp candidate from the motion vector of the current block. In this case, the information on the MVD may be signaled to the decoding apparatus. Further, if the (A)MVP mode is applied, a value of the reference picture index may be constituted as the reference picture index information and separately signaled to the decoding apparatus.

The encoding apparatus may determine whether to apply the refinement to the motion vector of the current block (S810).

In other words, the encoding apparatus may determine whether to apply the refinement in consideration of coding efficiency, complexity, prediction performance, and the like. At this time, the encoding apparatus may determine whether to apply the refinement to the current block using various application conditions expressed in Tables 1 to 20.

As an example, the encoding apparatus may determine whether to apply the refinement based on at least one of the size of the current block or the bi-prediction weight index information of the current block. For example, if the size of the current block is 16×16 or more, the encoding apparatus may determine to apply the DMVR to the motion vector of the current block. Further, if a value of bi-prediction weight index information of the current block is 0, the encoding apparatus may determine to apply the DMVR to the motion vector of the current block.

Here, the bi-prediction weight index information represents the aforementioned GbiIdx. This may be used as information related to indicating a weight factor applied to the L0 prediction and the L1 prediction, in the generalized bi-prediction capable of applying different weights to the L0 prediction and the L1 prediction. For example, if the merge mode is applied to the current block, the bi-prediction weight index information of the current block may be the same as bi-prediction weight index information of the neighboring block indicated by the merge index among the neighboring blocks of the current block.

Further, the encoding apparatus may determine whether to apply the DMVR-based refinement based on at least one of DMVR enabled flag information (e.g., sps_dmvr_enabled_flag) related to representing whether the DMVR is enabled, merge flag information (e.g., merge_flag) related to representing whether the merge mode is applied to the current block, or MMVD flag information (e.g., mmvd_flag) related to representing whether the merge mode with motion vector difference (MMVD) is applied to the current block. For example, the encoding apparatus may determine to apply the DMVR to the motion vector of the current block if a value of the DMVR enabled flag information is equal to 1, if a value of the merge flag information is equal to 1, or if a value of the MMVD flag information is equal to 0.

Further, the encoding apparatus may determine whether to apply the DMVR to the motion vector of the current block based on whether the bi-prediction performed based on the L0 reference picture and the L1 reference picture is applied to the current block or whether a distance between the current picture and the L0 reference picture and a distance between the current picture and the L1 reference picture are equal. For example, if the bi-prediction performed based on the L0 reference picture and the L1 reference picture is applied to the current block (e.g., in case of predFlagL0[0][0]=1 and predFlagL0[1][1]=1), or if the distance between the current picture and the L0 reference picture and the distance between the current picture and the L1 reference picture are equal to each other (e.g., in case of DiffPicOrderCnt (currPic, RefPicList0 [refIdxL0])−DiffPicOrderCnt (currPic, RefPicList1 [refIdxL1])=0), the encoding apparatus may determine to apply the DMVR to the motion vector of the current block.

Further, as another example, the encoding apparatus may determine whether to apply the DMVR to the motion vector of the current block based on whether the bi-prediction performed based on the L0 reference picture and the L1 reference picture is applied to the current block, whether the L0 reference picture and the L1 reference picture are temporally positioned in different directions with respect to the current picture, or whether the affine mode is applied to the current block. For example, if the bi-prediction performed based on the L0 reference picture and the L1 reference picture is applied to the current block (e.g., in case of predFlagL0=1 and predFlagL1=1), if the L0 reference picture and the L1 reference picture are temporally positioned in different directions with respect to the current picture (e.g., if DiffPicOrderCnt (currPic, refPicList0[refIdxL0]) *DiffPicOrderCnt (currPic, refPicList1 [refIdxL1] is smaller than 0), or if the affine mode is not applied to the current block (e.g., in case of MotionModelIdc=0), the encoding apparatus may determine to apply the DMVR to the motion vector of the current block.

Here, in determining whether to apply the DMVR-based refinement, the listed conditions are only one example, and may be used by variously combining the aforementioned conditions in Tables 1 to 20.

When determining to apply the refinement to the motion vector of the current block, the encoding apparatus may derive the refined motion vector by applying the DMVR to the motion vector (S820).

At this time, the encoding apparatus may apply the aforementioned DMVR process in FIG. 4. The process of deriving the refined motion vector by applying the DMVR has been described in detail, and therefore, a description thereof will be omitted here.

The encoding apparatus may derive the prediction samples for the current block based on the refined motion vector (S830).

According to the exemplary embodiment, the encoding apparatus may apply the refinement to the prediction samples of the current block. In this case, the encoding apparatus may apply the BDOF-based refinement to the prediction samples in consideration of coding efficiency, complexity, prediction performance, and the like.

As an example, the encoding apparatus may determine whether to apply the BDOF to the prediction samples based on at least one of the size of the current block or the bi-prediction weight index information of the current block. For example, if the size of the current block is 16×16 or more, the encoding apparatus may determine to apply the BDOF to the prediction samples. Further, if the value of the bi-prediction weight index information of the current block is equal to 0, the encoding apparatus may determine to apply the BDOF to the prediction samples.

Further, the encoding apparatus may determine whether to apply the BDOF-based refinement based on BDOF enabled flag information (e.g., sps_bdof_enabled_flag) related to representing whether the BDOF is enabled or subblock-based merge flag information (e.g., merge_subblock_flag) related to representing whether the subblock-based merge mode is applied to the current block. For example, the encoding apparatus may determine to apply the BDOF to the prediction samples if a value of the BDOF enabled flag information is equal to 1 or if a value of the subblock-based merge flag information is equal to 0.

Further, the encoding apparatus may determine whether to apply the BDOF to the prediction samples based on whether the bi-prediction performed based on the L0 reference picture and the L1 reference picture is applied to the current block, whether the L0 reference picture and the L1 reference picture are temporally positioned in different directions with respect to the current picture, or whether the affine mode is applied to the current block. For example, if the bi-prediction performed based on the L0 reference picture and the L1 reference picture is applied to the current block (e.g., in case of predFlagL0=1 and predFlagL1=1), if the L0 reference picture and the L1 reference picture are temporally positioned in different directions with respect to the current picture (e.g., if DiffPicOrderCnt (currPic, refPicList0[refIdxL0])*DiffPicOrderCnt (currPic, refPicList1[refIdxL1]) is smaller than 0), or if the affine mode is not applied to the current block (e.g., in case of MotionModelIdc=0), the encoding apparatus may determine to apply the BDOF to the prediction samples.

Further, as another example, the encoding apparatus may determine whether to apply the BDOF to the prediction samples based on whether the bi-prediction performed based on the L0 reference picture and the L1 reference picture is applied to the current block or whether the distance between the current picture and the L0 reference picture and the distance between the current picture and the L1 reference picture are equal. For example, if the bi-prediction performed based on the L0 reference picture and the L1 reference picture is applied to the current block (e.g., in case of predFlagL0[0][0]=1 and predFlagL0[1][1]=1) or if the distance between the current picture and the L0 reference picture and the distance between the current picture and the L1 reference picture are equal to each other (e.g., in case of DiffPicOrderCnt (currPic, RefPicList0 [refIdxL0])−DiffPicOrderCnt (currPic, RefPicList1 [refIdxL1])=0), the encoding apparatus may determine to apply the BDOF to the prediction samples.

Here, in determining whether to apply the BDOF-based refinement, the listed conditions are only one example, and may be used by variously combining the aforementioned conditions in Tables 1 to 20.

When determining to apply the BDOF to the prediction samples, the encoding apparatus may derive the refined prediction samples by applying the BDOF to the prediction samples.

The encoding apparatus may derive the residual samples based on the prediction samples (S840), and generate the residual information based on the residual samples (S850).

In other words, the encoding apparatus may derive the residual samples based on the original samples for the current block and the prediction samples of the current block. Further, the encoding apparatus may generate the information on the residual samples.

The encoding apparatus may encode the image information including the residual information (S860).

In other words, the encoding apparatus may encode the information on the residual samples to output the encoded information in the form of the bitstream, and transmit the bitstream to the decoding apparatus through a network or a storage medium.

Further, the encoding apparatus may encode the aforementioned information derived in the steps S800 to S830 to output the encoded information in the form of the bitstream. For example, the DMVR enabled flag information, the merge flag information, the MMVD flag information, the BDOF enabled flag information, and the subblock-based merge flag information may be included in the image information and encoded, and the encoded image information may be signaled to the decoding apparatus.

Figure 9:
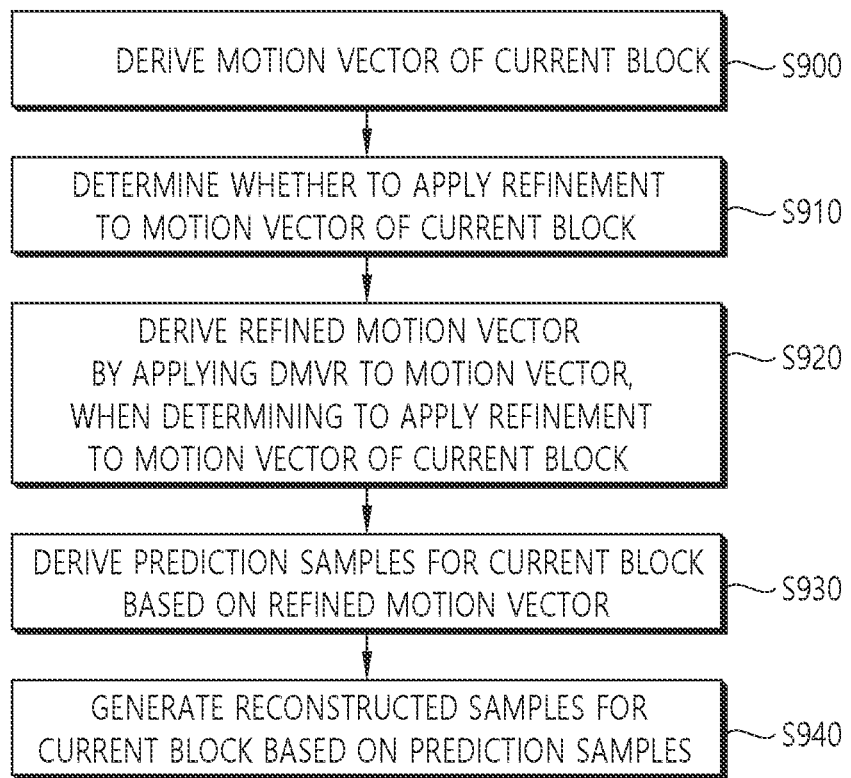
FIG. 9 is a flowchart schematically illustrating a decoding method which may be performed by a decoding apparatus according to the exemplary embodiment of the present document.

FIG. 9 is a flowchart schematically illustrating a decoding method which may be performed by the decoding apparatus according to the exemplary embodiment of the present document.

A method illustrated in FIG. 9 may be performed by the decoding apparatus 300 illustrated in FIG. 3. Specifically, steps S900 to S930 in FIG. 9 may be performed by the predictor 330 and the inter predictor 332 illustrated in FIG. 3, and a step S940 in FIG. 9 may be performed by the adder 340 illustrated in FIG. 3. Further, the method illustrated in FIG. 9 may include the aforementioned exemplary embodiments in the present document. Therefore, in FIG. 9, a specific description of contents overlapping the aforementioned exemplary embodiments will be omitted and simplified.

Referring to FIG. 9, the decoding apparatus may derive the motion vector of the current block (S900).

As an example, the decoding apparatus may determine the prediction mode for the current block based on the prediction information signaled from the encoding apparatus. Further, the decoding apparatus may derive the motion information (the motion vector, the reference picture index, and the like) of the current block based on the prediction mode. Here, the prediction mode may include the skip mode, the merge mode, the (A)MVP mode, and the like.

For example, if the skip mode or the merge mode is applied to the current block, the decoding apparatus may construct the merge candidate list, and select one merge candidate of the merge candidates included in the merge candidate list. At this time, one merge candidate may be selected from the merge candidate list based on the aforementioned merge index information (merge index). The decoding apparatus may derive the motion information of the current block using the motion information of the selected merge candidate. In other words, the motion information of the merge candidate selected by the merge index among the merge candidates included in the merge candidate list may be used as the motion information of the current block.

As another example, if the (A)MVP mode is applied to the current block, the decoding apparatus may construct the (A)MVP candidate list, and use the motion vector of the selected mvp candidate among the motion vector predictor (mvp) candidates included in the (A)MVP candidate list as the mvp of the current block. The mvp candidate may be selected based on the mvp flag information (mvp flag or mvp index). Further, the decoding apparatus may derive the MVD of the current block based on the information on the MVD signaled from the encoding apparatus. In this case, the decoding apparatus may derive the motion vector of the current block based on the mvp and MVD of the current block. Further, the decoding apparatus may derive the reference picture index of the current block based on the reference picture index information signaled from the encoding apparatus. At this time, the picture indicated by the reference picture index in the reference picture list for the current block may be derived as the reference picture referred for the inter prediction of the current block.

The decoding apparatus may determine whether to apply the refinement to the motion vector of the current block (S910).

As an example, the decoding apparatus may determine whether to apply the refinement based on at least one of the size of the current block or the bi-prediction weight index information of the current block. For example, if the size of the current block is 16×16 or more, the decoding apparatus may determine to apply the DMVR to the motion vector of the current block. Further, if the value of the bi-prediction weight index information of the current block is equal to 0, the decoding apparatus may determine to apply the DMVR to the motion vector of the current block.

Here, the bi-prediction weight index information represents the aforementioned GbiIdx. This may be used as the information related to indicating the weight factor applied to the L0 prediction and the L1 prediction, in the generalized bi-prediction capable of applying different weights to the L0 prediction and the L1 prediction. For example, if the merge mode is applied to the current block, the bi-prediction weight index information of the current block may be the same as the bi-prediction weight index information of the neighboring block indicated by the merge index among the neighboring blocks of the current block.

Further, the decoding apparatus may obtain at least one of the DMVR enabled flag information (e.g., sps_dmvr_enabled_flag) related to representing whether the DMVR is enabled, the merge flag information (e.g., merge_flag) related to representing whether the merge mode is applied to the current block, or the MMVD flag information (e.g., mmvd_flag) related to representing whether the merge mode with motion vector difference (MMVD) is applied to the current block from the bitstream, and determine whether to apply the DMVR-based refinement based on the information obtained from the bitstream. For example, the decoding apparatus may determine to apply the DMVR to the motion vector of the current block if the value of the DMVR enabled flag information is equal to 1, if the value of the merge flag information is equal to 1, or if the value of the MMVD flag information is equal to 0.

Further, the decoding apparatus may determine whether to apply the DMVR to the motion vector of the current block based on whether the bi-prediction performed based on the L0 reference picture and the L1 reference picture is applied to the current block or whether the distance between the current picture and the L0 reference picture and the distance between the current picture and the L1 reference picture are equal. For example, if the bi-prediction performed based on the L0 reference picture and the L1 reference picture is applied to the current block (e.g., in case of predFlagL0[0][0]=1 and predFlagL0[1][1]=1) or if the distance between the current picture and the L0 reference picture and the distance between the current picture and the L1 reference picture are equal to each other (e.g., in case of DiffPicOrderCnt (currPic, RefPicList0 [refIdxL0])−DiffPicOrderCnt (currPic, RefPicList1 [refIdxL1])=0), the decoding apparatus may determine to apply the DMVR to the motion vector of the current block.

Further, as another example, the decoding apparatus may determine whether to apply the DMVR to the motion vector of the current block based on whether the bi-prediction performed based on the L0 reference picture and the L1 reference picture is applied to the current block, whether the L0 reference picture and the L1 reference picture are temporally positioned in different directions with respect to the current picture, or whether the affine mode is applied to the current block. For example, if the bi-prediction performed based on the L0 reference picture and the L1 reference picture is applied to the current block (e.g., in case of predFlagL0=1 and predFlagL1=1), if the L0 reference picture and the L1 reference picture are temporally positioned in different directions with respect to the current picture (e.g., if DiffPicOrderCnt (currPic, refPicList0[refIdxL0])*DiffPicOrderCnt (currPic, refPicList1 [refIdxL1]) is smaller than 0), or if the affine mode is not applied to the current block (e.g., in case of MotionModelIdc=0), the decoding apparatus may determine to apply the DMVR to the motion vector of the current block.

Here, in determining whether to apply the DMVR-based refinement, the listed conditions are only one example, and may be used by variously combining the aforementioned conditions in Tables 1 to 20.

When determining to apply the refinement to the motion vector of the current block, the decoding apparatus may derive the refined motion vector by applying the DMVR to the motion vector (S920).

At this time, the decoding apparatus may apply the aforementioned DMVR process in FIG. 4. The process of deriving the refined motion vector by applying the DMVR has been described in detail in FIG. 4, and therefore, a description thereof will be omitted here.

The decoding apparatus may derive the prediction samples for the current block based on the refined motion vector (S930).

According to the exemplary embodiment, the decoding apparatus may apply the refinement to the prediction samples of the current block.

As an example, the decoding apparatus may determine whether to apply the BDOF to the prediction samples based on at least one of the size of the current block or the bi-prediction weight index information of the current block. For example, if the size of the current block is 16×16 or more, the decoding apparatus may determine to apply the BDOF to the prediction samples. Further, if the value of the bi-prediction weight index information of the current block is equal to 0, the decoding apparatus may determine to apply the BDOF to the prediction samples.

Further, the decoding apparatus may obtain at least one of the BDOF enabled flag information (e.g., sps_bdof_enabled_flag) related to representing whether the BDOF is enabled or the subblock-based merge flag information (e.g., merge_subblock_flag) related to representing whether the subblock-based merge mode is applied to the current block from the bitstream, and determine whether to apply the BDOF-based refinement based on the information obtained from the bitstream. For example, if the value of the BDOF enabled flag information is equal to 1 or if the value of the subblock-based merge flag information is equal to 0, the decoding apparatus may determine to apply the BDOF to the prediction samples.

Further, the decoding apparatus may determine whether to apply the BDOF to the prediction samples based on whether the bi-prediction performed based on the L0 reference picture and the L1 reference picture is applied to the current block, whether the L0 reference picture and the L1 reference picture are temporally positioned in different directions with respect to the current picture, or whether the affine mode is applied to the current block. For example, if the bi-prediction performed based on the L0 reference picture and the L1 reference picture is applied to the current block (e.g., in case of predFlagL0=1 and predFlagL1=1), if the L0 reference picture and the L1 reference picture are temporally positioned in different directions with respect to the current picture (e.g., if DiffPicOrderCnt (currPic, refPicList0[refIdxL0])*DiffPicOrderCnt (currPic, refPicList1 [refIdxL1]) is smaller than 0), or if the affine mode is not applied to the current block (e.g., in case of MotionModelIdc=0), the decoding apparatus may determine to apply the BDOF to the prediction samples.

Further, as another example, the decoding apparatus may determine whether to apply the BDOF to the prediction samples based on whether the bi-prediction performed based on the L0 reference picture and the L1 reference picture is applied to the current block or whether the distance between the current picture and the L0 reference picture and the distance between the current picture and the L1 reference picture are equal. For example, if the bi-prediction performed based on the L0 reference picture and the L1 reference picture is applied to the current block (e.g., in case of predFlagL0[0][0]=1 and predFlagL0[1][1]=1) or if the distance between the current picture and the L0 reference picture and the distance between the current picture and the L1 reference picture are equal to each other (e.g., in case of DiffPicOrderCnt (currPic, RefPicList0 [refIdxL0])−DiffPicOrderCnt (currPic, RefPicList1 [refIdxL1])=0), the decoding apparatus may determine to apply the BDOF to the prediction samples.

Here, in determining whether to apply the BDOF-based refinement, the listed conditions are only one example, and may be used by variously combining the aforementioned conditions in Tables 1 to 20.

When determining to apply the BDOF to the prediction samples, the decoding apparatus may derive the refined prediction samples by applying the BDOF to the prediction samples.

The decoding apparatus may generate the reconstructed samples for the current block based on the prediction samples (S940).

As an example, the decoding apparatus may also use the prediction samples directly as the reconstructed samples according to the prediction mode, or also generate the reconstructed samples by adding the residual samples to the prediction samples.

If the residual sample for the current block exists, the decoding apparatus may receive the information on the residual for the current block. The information on the residual may include the transform coefficient for the residual samples. The decoding apparatus may derive the residual samples (or the residual sample array) for the current block based on the residual information. The decoding apparatus may generate the reconstructed samples based on the prediction samples and the residual samples, and derive the reconstructed block or the reconstructed picture based on the reconstructed samples.

In the aforementioned embodiments, although the methods have been described based on the flowcharts in the form of a series of steps or units, the embodiments of this document are not limited to the order of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of rights of this document.

The aforementioned method according to this document may be implemented in a software form, and the encoding apparatus and/or the decoding apparatus according to this document may be included in an apparatus for performing image processing, for example, TV, a computer, a smartphone, a set-top box or a display device.

In this document, when embodiments are implemented in a software form, the aforementioned method be implemented as a module (process, function, etc.) for performing the aforementioned function. The module may be stored in the memory and executed by the processor. The memory may be placed inside or outside the processor and connected to the processor by various well-known means. The processor may include application-specific integrated circuits (ASICs), other chipsets, logic circuits and/or data processing devices. The memory may include read-only memory (ROM), random access memory (RAM), flash memory, memory cards, storage media and/or other storage devices. That is, the embodiments described in this document may be implemented and performed on a processor, a micro processor, a controller or a chip. For example, the function units illustrated in the drawings may be implemented and performed on a computer, a processor, a micro processor, a controller or a chip. In this case, information (e.g., information on instructions) or an algorithm for such implementation may be stored in a digital storage medium.

Furthermore, the decoding apparatus and the encoding apparatus to which this document is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blueray player, Internet access TV, a home theater system, a smartphone, a tablet PC, and a digital video recorder (DVR).

Furthermore, the processing method to which this document is applied may be produced in the form of a program executed by a computer, and may be stored in a computer-readable recording medium. Multimedia data having a data structure according to this document may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of this document may be implemented as a computer program product using program code. The program code may be performed by a computer according to an embodiment of this document. The program code may be stored on a carrier readable by a computer.

Figure 10:
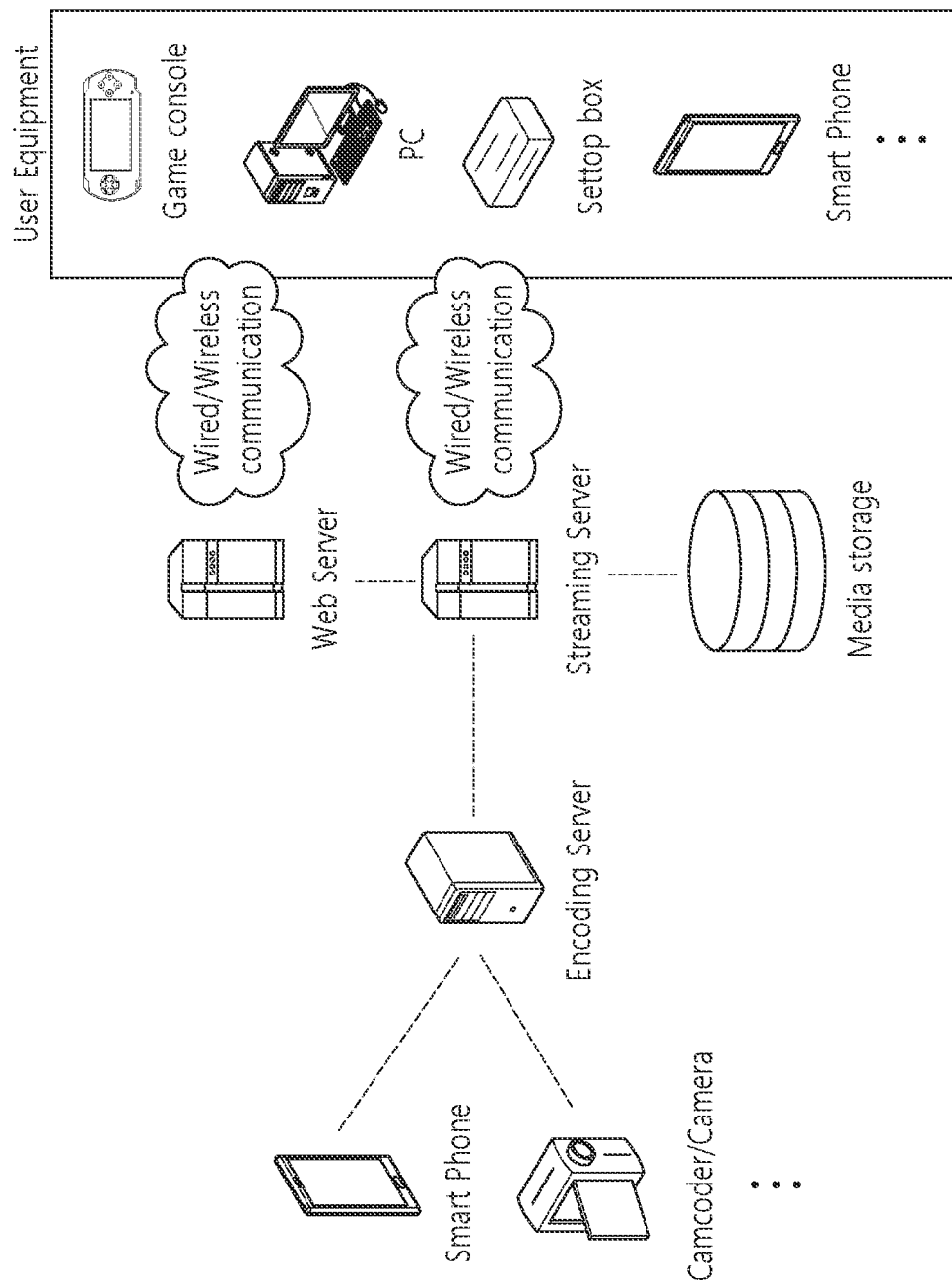
FIG. 10 illustrates an example of a content streaming system to which the exemplary embodiments disclosed in the present document are applicable.

FIG. 10 illustrates an example of a content streaming system to which embodiments disclosed in this document may be applied.

Referring to FIG. 10, the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like.

Each server in the content streaming system may be operated as a distributed server, in which case data received from each server may be distributed.

What is claimed is:

1. An image decoding method performed by a decoding apparatus, the method comprising:
    deriving a motion vector of a current block;
    determining whether to apply a decoder-side motion vector refinement (DMVR) for refinement of the motion vector of the current block;
    deriving a refined motion vector by applying the DMVR to the motion vector, based on a case of determining to apply the DMVR to the motion vector of the current block;
    deriving prediction samples for the current block based on the refined motion vector; and
    generating reconstructed samples for the current block based on the prediction samples,
    wherein the determining whether to apply the DMVR determines to apply the DMVR to the motion vector of the current block, based on a case where bi-prediction performed based on an L0 reference picture and an L1 reference picture is applied to the current block, a distance between a current picture and the L0 reference picture and a distance between the current picture and the L1 reference picture are equal, a value of merge mode with motion vector difference (MMVD) flag information related to whether or not MMVD is applied to the current block is equal to 0, and a value of bi-prediction weight index information of the current block is equal to 0,
    wherein the prediction samples are derived by determining whether to apply Bi-directional optical flow (BDOF),
    wherein the determining whether to apply the BDOF determines to apply the BDOF to the prediction samples, based on a case where the bi-prediction performed based on the L0 reference picture and the L1 reference picture is applied to the current block, a distance between the current picture and the L0 reference picture and a distance between the current picture and the L1 reference picture are equal, and a value of the bi-prediction weight index information of the current block is equal to 0.

2. The image decoding method of claim 1, wherein the determining of whether to apply the DMVR determines to apply the DMVR to the motion vector of the current block based on a size of the current block being greater than or equal to 16×16.

3. The image decoding method of claim 1, wherein the bi-prediction weight index information of the current block is the same as bi-prediction weight index information of a neighboring block indicated by a merge index of neighboring blocks of the current block based on a case where a merge mode is applied to the current block.

4. The image decoding method of claim 1, wherein the determining of whether to apply the BDOF determines to apply the BDOF to the prediction samples based on a size of the current block being greater than or equal to 16×16.

5. The image decoding method of claim 1, further comprising: obtaining at least one of DMVR enabled flag information related to representing whether the DMVR is enabled, or merge flag information related to representing whether a merge mode is applied to the current block from a bitstream,
    wherein the determining of whether to apply the DMVR determines to apply the DMVR to the motion vector of the current block, based on a case where a value of the DMVR enabled flag information is a value related to representing that the DMVR is enabled, or a value of the merge flag information is equal to 1.

6. The image decoding method of claim 1, further comprising: obtaining BDOF enabled flag information related to representing whether the BDOF is enabled or subblock-based merge flag information related to representing whether a subblock-based merge mode is applied to the current block from a bitstream,
    wherein the determining of whether to apply the BDOF determines to apply the BDOF to the prediction samples, based on a case where a value of the BDOF enabled flag information is a value related to representing that the BDOF is enabled or a value of the sub-block-based merge flag information is equal to 0.

7. The image decoding method of claim 1, wherein the determining of whether to apply the BDOF determines to apply the BDOF to the prediction samples, based on a case where an affine mode is not applied to the current block.

8. An image encoding method performed by an encoding apparatus, the method comprising:
    deriving a motion vector of a current block;
    determining whether to apply a decoder-side motion vector refinement (DMVR) for refinement of the motion vector of the current block;
    deriving a refined motion vector by applying the DMVR to the motion vector, based on a case of determining to apply the DMVR to the motion vector of the current block;
    deriving prediction samples for the current block based on the refined motion vector;
    deriving residual samples based on the prediction samples;
    generating residual information based on the residual samples; and
    encoding image information including the residual information,
    wherein the determining whether to apply the DMVR determines to apply the DMVR to the motion vector of the current block, based on a case where bi-prediction performed based on an L0 reference picture and an L1 reference picture is applied to the current block, a distance between a current picture and the L0 reference picture and a distance between the current picture and the L1 reference picture are equal, a value of merge mode with motion vector difference (MMVD) flag information related to whether or not MMVD is applied to the current block is equal to 0, and a value of bi-prediction weight index information of the current block is equal to 0, wherein the prediction samples are derived by determining whether to apply Bi-directional optical flow (BDOF), wherein the determining whether to apply the BDOF determines to apply the BDOF to the prediction samples, based on a case where the bi-prediction performed based on the L0 reference picture and the L1 reference picture is applied to the current block, a distance between the current picture and the L0 reference picture and a distance between the current picture and the L1 reference picture are equal, and a value of the bi-prediction weight index information of the current block is equal to 0.

9. The image encoding method of claim 8, wherein the determining of whether to apply the DMVR determines to apply the DMVR to the motion vector of the current block based on a size of the current block being greater than or equal to 16×16.

10. The image encoding method of claim 8, wherein the determining of whether to apply the BDOF determines to apply the BDOF to the prediction samples based on a size of the current block being greater than or equal to 16×16.

11. The image encoding method of claim 8, wherein the image information includes at least one of DMVR enabled flag information related to representing whether the DMVR is enabled, or merge flag information related to representing whether a merge mode is applied to the current block, wherein the determining of whether to apply the DMVR determines to apply the DMVR to the motion vector of the current block, based on a case where a value of the DMVR enabled flag information is a value related to representing that the DMVR is enabled, or a value of the merge flag information is equal to 1.

12. The image encoding method of claim 8, wherein the image information includes at least one of BDOF enabled flag information related to representing whether the BDOF is enabled or subblock-based merge flag information related to representing whether a subblock-based merge mode is applied to the current block, wherein the determining of whether to apply the BDOF determines to apply the BDOF to the prediction samples, based on a case where a value of the BDOF enabled flag information is a value related to representing that the BDOF is enabled or a value of the subblock-based merge flag information is equal to 0.

13. The image encoding method of claim 8, wherein the determining of whether to apply the BDOF determines to apply the BDOF to the prediction samples, based on a case where an affine mode is not applied to the current block.

14. Non-transitory computer-readable digital storage medium storing a bitstream generated by a method, the method comprising:

deriving a motion vector of a current block;

determining whether to apply a decoder-side motion vector refinement (DMVR) for refinement of the motion vector of the current block;

deriving a refined motion vector by applying the DMVR to the motion vector, based on a case of determining to apply the DMVR to the motion vector of the current block;

deriving prediction samples for the current block based on the refined motion vector;

deriving residual samples based on the prediction samples;

generating residual information based on the residual samples; and encoding image information including the residual information to generate the bitstream, wherein the determining whether to apply the DMVR determines to apply the DMVR to the motion vector of the current block, based on a case where bi-prediction performed based on an L0 reference picture and an L1 reference picture is applied to the current block, a distance between a current picture and the L0 reference picture and a distance between the current picture and the L1 reference picture are equal, a value of merge mode with motion vector difference (MMVD) flag information related to whether or not MMVD is applied to the current block is equal to 0, and a value of bi-prediction weight index information of the current block is equal to 0, wherein the prediction samples are derived by determining whether to apply Bi-directional optical flow (BDOF), wherein the determining whether to apply the BDOF determines to apply the BDOF to the prediction samples, based on a case where the bi-prediction performed based on the L0 reference picture and the L1 reference picture is applied to the current block, a distance between the current picture and the L0 reference picture and a distance between the current picture and the L1 reference picture are equal, and a value of the bi-prediction weight index information of the current block is equal to 0.

* * * * *